(12) United States Patent
Komura et al.

(10) Patent No.: US 7,921,366 B2
(45) Date of Patent: Apr. 5, 2011

(54) INFORMATION PROCESSING APPARATUS, ASSIGNMENT METHOD AND DISPLAY METHOD OF INFORMATION PROCESSING APPARATUS, AND COMPUTER-READABLE PROGRAM PRODUCT

(75) Inventors: Akinori Komura, Kanagawa (JP); Yoshifumi Matsunaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 314 days.

(21) Appl. No.: 11/477,721

(22) Filed: Jun. 30, 2006

(65) Prior Publication Data

US 2007/0118807 A1 May 24, 2007

(30) Foreign Application Priority Data

Nov. 9, 2005 (JP) .................................. 2005-324843

(51) Int. Cl.
*G06F 3/00* (2006.01)
(52) U.S. Cl. .......................... 715/745; 715/738; 715/747
(58) Field of Classification Search .................. 715/733, 715/761, 738, 739, 744, 745, 746, 747, 789, 715/810, 811, 837, 867; 345/172; 708/144, 145, 146
See application file for complete search history.

(56) References Cited

U.S. PATENT DOCUMENTS

| 5,488,385 A * | 1/1996 | Singhal et al. ................. 345/3.1 |
| 2008/0131184 A1 * | 6/2008 | Brown et al. ................. 400/490 |

FOREIGN PATENT DOCUMENTS

| JP | A 10-254910 | 9/1998 |
| JP | A 10-265331 | 10/1998 |
| JP | A 11-195027 | 7/1999 |

* cited by examiner

*Primary Examiner* — Ba Huynh
*Assistant Examiner* — Enrique W Iturralde
(74) *Attorney, Agent, or Firm* — Oliff & Berridge, PLC

(57) ABSTRACT

An information processing apparatus includes: a plurality of displays; a plurality of display instruction units; and an assignment unit that assigns a target selected on at least any one of the displays to one of the display instruction units so as to configure the display instruction unit that the target is to be displayed on one of the displays in accordance with a command input by the assigned one of the display instruction units.

18 Claims, 21 Drawing Sheets

FIG. 4

| BUTTON NAME | DISPLAY NAME | COLOR | SIZE | SHAPE | CONNECTION DESTINATION |
|---|---|---|---|---|---|
| BUTTON 001 | ○○COMPANY HP | BLACK | LARGE | RECTANGLE 1 | http://www.○○.co.jp |
| BUTTON 002 | △△COMPANY HP | BLACK | LARGE | RECTANGLE 1 | http://www.△△.co.jp |
| BUTTON 003 | □□COMPANY HP | BLACK | LARGE | RECTANGLE 1 | http://www.□□.co.jp |
| BUTTON 004 | ××COMPANY HP | BLACK | LARGE | RECTANGLE 1 | http://www.××.co.jp |
| BUTTON 005 | △○COMPANY HP | BLACK | LARGE | RECTANGLE 1 | http://www.△○.co.jp |
| BUTTON 006 | ×△COMPANY HP | BLACK | LARGE | RECTANGLE 1 | http://www.×△.co.jp |
| BUTTON 007 | △□REPORT | BLACK | LARGE | RECTANGLE 1 | C:¥report¥△□.doc |
| BUTTON 008 | ○△REVIEW | BLACK | LARGE | RECTANGLE 1 | ¥¥129.249.xxx.yyy¥review¥○△.ppt |
| ⋮ | ⋮ | ⋮ | ⋮ | ⋮ | ⋮ |

S40
ERASION PROCESSING

INFORMATION PROCESSING APPARATUS, ASSIGNMENT METHOD AND DISPLAY METHOD OF INFORMATION PROCESSING APPARATUS, AND COMPUTER-READABLE PROGRAM PRODUCT

CROSS-REFERENCE TO RELATED APPLICATION

This application claims priority under 35 USC 119 from Japanese Patent Application No. 2005-324843 filed on Nov. 9, 2005, the disclosure of which is incorporated by reference herein.

FIELD

The present invention relates to an art of functionally integrating computation environments of a personal computer, a display, a loudspeaker, etc., to construct a computing environment for allowing the user to efficiently handle different types of complicated work.

BACKGROUND

Generally, in a personal computer (PC) or any other apparatus having a Web page browsing function in related arts, if the user displays a specific Web page, he or she executes multiple steps of starting browser software, displaying a pull-down menu of linked URLs, and specifies the objective Web page. As an easier method, the user can place a browser start short cut icon for displaying the objective Web page on the desktop, thereby displaying the specific Web page by one-touch operation.

There is known an art wherein the user provides several CG images, registers a pair of the URL of a Web page and any desired CG image as a bookmark, and places this CG image on a virtual town, thereby providing a short cut icon in a one-to-one correspondence with a link to the target content.

However, in the arts described above, the user can start only one content display window by one operation using an icon or a menu for displaying the target content. Further, the user cannot set a link to a plurality of contents displayed on the window in one icon. Thus, to open a plurality of relevant windows, the user needs to operate the apparatus as many times as the number of the windows and often spends fruitless time. It is also difficult for the user to instantaneously select a plurality of relevant windows required for a work set.

SUMMARY

An information processing apparatus includes: a plurality of displays; a plurality of display instruction units; and an assignment unit that assigns a target selected on at least any one of the displays to one of the display instruction units so as to configure the display instruction unit that the target is to be displayed on one of the displays in accordance with a command input by the assigned one of the display instruction units.

BRIEF DESCRIPTION OF THE DRAWINGS

In the accompanying drawings:

FIG. 4 is a drawing to illustrate a button management table for managing items assigned to display buttons;

DETAILED DESCRIPTION

Figure 1:
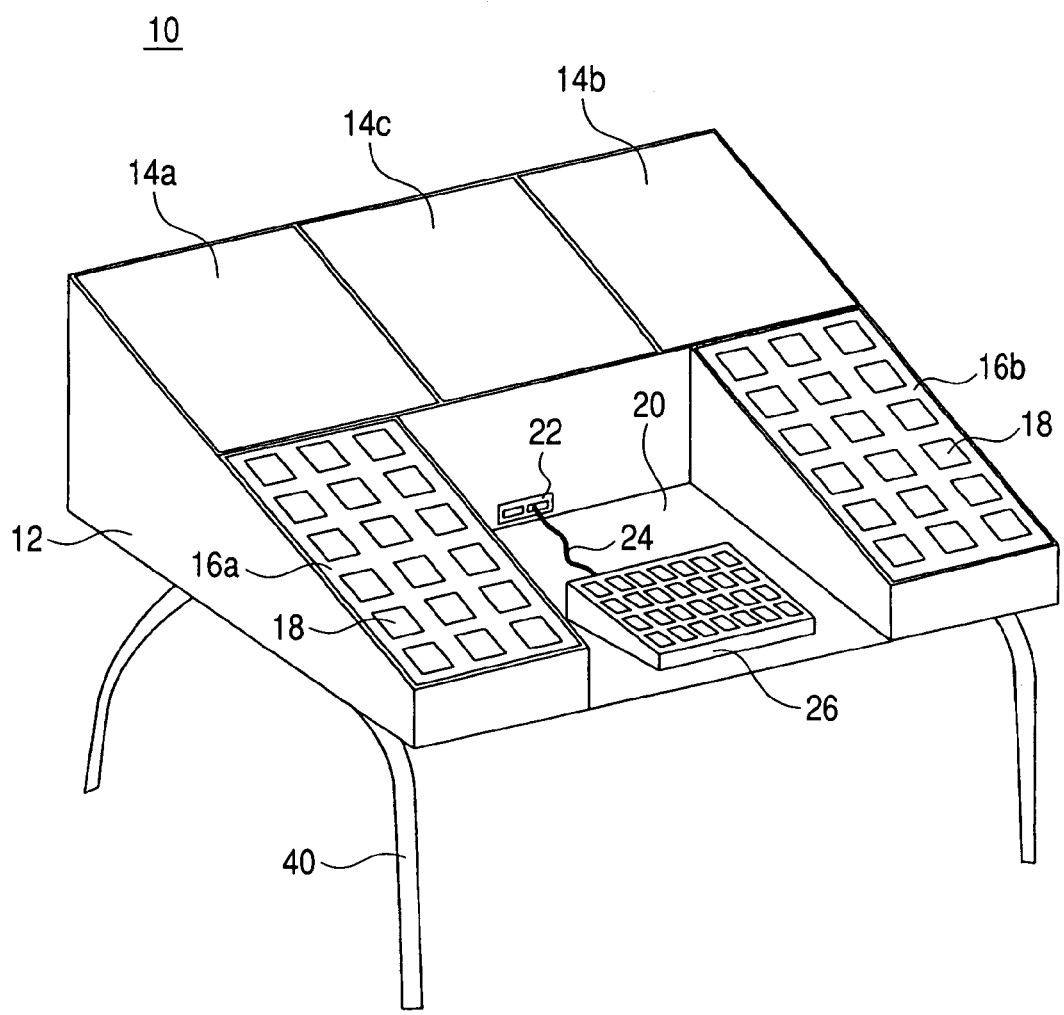
FIG. 1 is a drawing to show an information processing apparatus according to an embodiment.

FIG. 1 is a drawing to show an information processing apparatus 10 according to an embodiment.

As shown in FIG. 1, the information processing apparatus 10 is configured centering on an apparatus main unit 12 and has legs 40 for supporting the apparatus main unit 12, displays 14a to 14c, information access units 16a and 16b having buttons (button group) that serves as a display instruction unit for specifying the targets displayed on the displays 14a to 14c, and an input/output interface (IF) 22. The information processing apparatus 10 also has a loudspeaker (not shown) for producing predetermined sounds.

The legs 40 may be detachable and the apparatus main unit 12 may be placed on a table, etc., for use. When any of a plurality of the components such as the displays 14a to 14c is displayed without specification, it may be simply described as the display 14, etc.

The displays 14a to 14c are provided on the front of the apparatus main unit 12 and are arranged in a lateral direction. The displays 14a to 14c are liquid crystal displays of the same screen size, for example. The display 14 displays predetermined information under the control of a control unit 100 described later.

The display 14 may be a virtual computer display. The displays 14 may be implemented as a CRT, a PDP, etc., and may be different in screen size.

The information access units 16a and 16b are located in front of the displays 14 relative to the user and at the left and the right of the apparatus main unit 12. The information access unit 16 is implemented as a touch panel, for example, and displays predetermined information under the control of the control unit 100 and further accepts user entry and outputs the user entry to the control unit 100. The information access unit 16 may be located at either the right or the left of the apparatus main unit 12.

The information access unit 16 is provided with a plurality of buttons 18 that serves as a display instruction unit. Predetermined operation such as specification of a display target or computation is assigned to each button 18. When the user presses any button 18, the information access unit 16 accepts the desired specification from the user. The operation, etc., when the button 18 is pressed is described later in detail.

A placement section 20 on which a predetermined article is placed is provided between the information access units 16a and 16b. An input unit 26 such as a personal computer (PC) may be placed on the top of the placement section 20. The input unit 26 includes a keyboard and a pointing device and is connected to the input/output IF 22 via a communication cable 24 for communicating data with the control unit 100 of the information processing apparatus 10.

The user uses the information processing apparatus 10 to access a Web page provided through a network, a file stored in a storage unit, etc., and do a large number of jobs at multiple levels.

Figure 2:
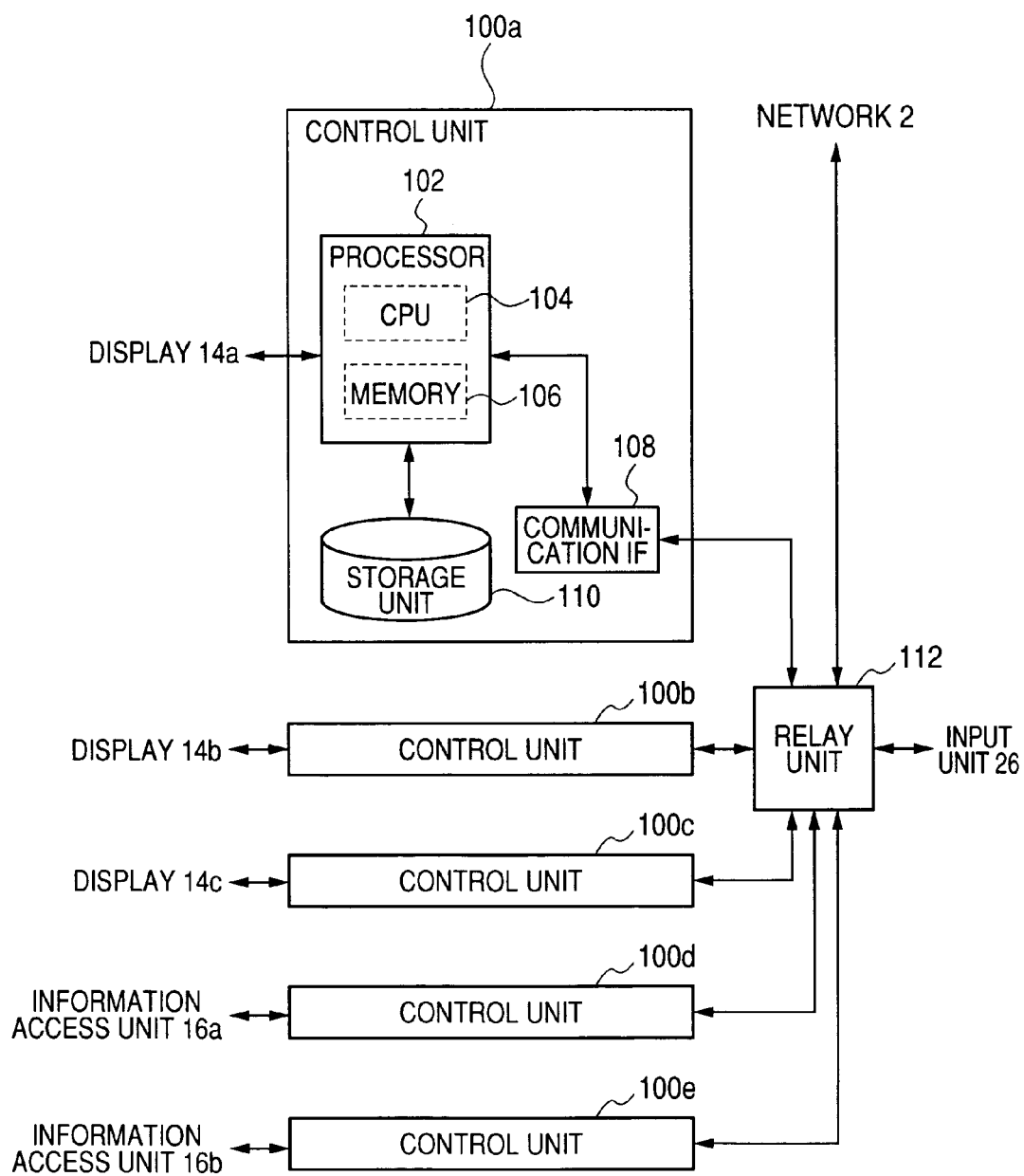
FIG. 2 is a drawing to show the hardware configuration of computers used in the information processing apparatus.

FIG. 2 is a drawing to show the hardware configuration of computers used in the information processing apparatus 10.

As shown in FIG. 2, the information processing apparatus 10 has control units 100a to 100e and a relay unit 112, and each of the control units 100a to 100e has a processor 102 containing a CPU 104 and memory 106, a communication IF 108, and a storage unit 110.

In the control unit 100, the communication IF 108 communicates predetermine data with any other control unit 100, the external input unit 26, a network 2 such as a LAN or a WAN. The storage unit 110 is an HDD, CD, or DVD unit, for example, and stores and plays back data.

Thus, the control unit 100 has a component as a computer that can perform information processing by program execution and conduct communications with any other control unit 100, etc., through the network.

The relay unit 112 relays data transmitted and received to and from the control unit 100 and conducts communications with the input unit 26 and an external computer (not shown) connected through the network 2 through the input/output IF 22. The relay unit 112 may be implemented as a server. If each control unit 100 is implemented in a mode having a network address of PC, etc., the control units 100 may be connected directly in a point-to-point manner not via the relay unit 112.

The control unit 100a controls information displayed on the first display 14a, the control unit 100b controls information displayed on the second display 14b, and the control unit 100c controls information displayed on the third display 14c. The control unit 100d controls information displayed on the first information access unit 16a and accepts input from the first information access unit 16a. Likewise, the control unit 100e controls information displayed on the second information access unit 16b and accepts input from the second information access unit 16b. Thus, the displays 14a to 14c and the information access units 16a and 16b are controlled by the different control units 100. The control unit 100 may be implemented as a usual PC.

Further, the control unit 100a causes the second display 14b, the third display 14c, and the information access units 16a and 16b to display predetermined information. In this case, the control unit 100a communicates data with the control unit 100b for causing the second display 14b to display the information, for example. The control unit 100a accepts the data input from the information access units 16a and 16b through the control units 100d and 100e. Likewise, the control units 100b to 100e also cause any displays 14, etc., to display information and accept data from any information access unit 16.

Any control unit 100 may control a plurality of displays 14 and information access units 16 or may control all of them. One control unit 100 may contain a plurality of CPUs 104 and memories 106.

Figure 3:
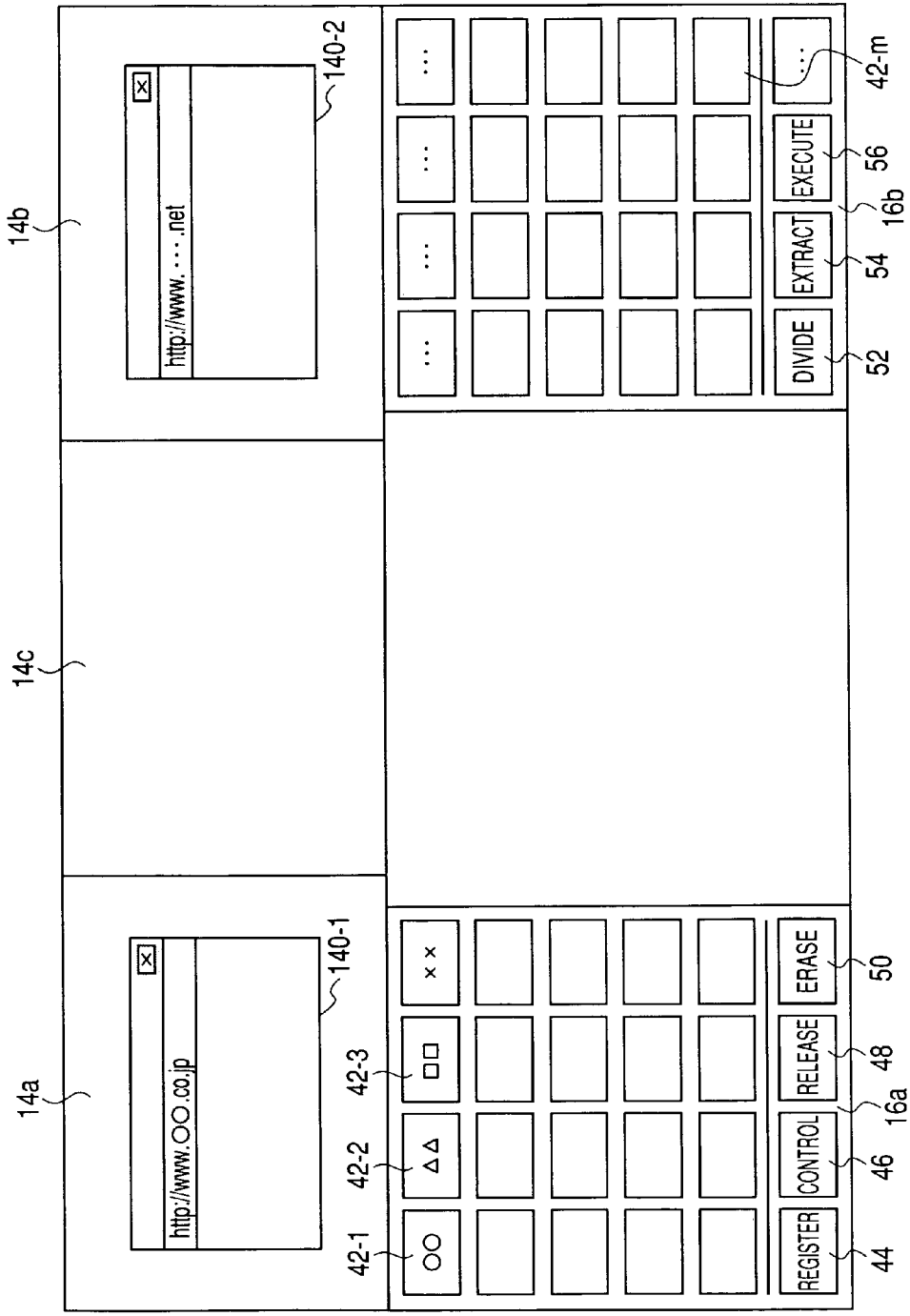
FIG. 3 is a drawing to illustrate buttons (button group) displayed on information access units and windows displayed on displays.

FIG. 3 is a drawing to illustrate the buttons (button group) displayed on the information access units 16 and windows 140 displayed on the displays 14.

As illustrated in FIG. 3, the button group includes display buttons 42-1 to 42-m and function buttons. The function buttons include a register button 44, a control button 46, a release button 48, an erase button 50, a divide button 52, an extract button 54, and an execute button 56. The display buttons 42 and the function buttons are displayed each in a pressable shape and size. The number of the buttons is not limited to that in the example and the layout of the buttons is not limited to the layout shown in FIG. 3 either.

The display buttons 42 are buttons for specifying the target (content) to be displayed on the display 14. The specified targets include a Web page, an electronic file retained in the storage unit 110, an electronic file retained in any other electronic machine connected through the network 2, etc. The connection destinations for specifying the targets are registered in the display buttons 42. Hereinafter, the connection destinations will also be called link destinations.

For example, when the user presses the display button 42-1, the Web page registered in the display button 42-1 is displayed on at least any of the displays 14a to 14c. In the example, windows 140-1 and 140-2 are displayed on the displays 14a and 14b. If the user presses the display button 42 for specifying a stored electronic file, a predetermined application is started and the specified electronic file is displayed on any of the displays 14.

The function buttons are a generic name for the buttons for specifying predetermined operation, such as the register button 44 and the control button 46. The register button 44 is a button for assigning the target to any of the display buttons 42. The control button 46 is a button for controlling enable or disable of registration in the display button 42. The release button 48 is a button for releasing the state in which any function button is pressed. The erase button 50 is a button for erasing the description registered in the display button 42. The divide button 52 is a button for registering a plurality of targets in different display buttons 42. The extract button 54 is a button for extracting information concerning each target contained in a folder. The execute button 56 is a button for complementing and completing registration operation. The function buttons are described later in detail.

FIG. 4 is a drawing to illustrate a button management table for managing items assigned to the display buttons 42.

As illustrated in FIG. 4, the button name, the display name, the color, the size, the shape, and the connection destination are registered for each of the display buttons 42. The items are stored in the storage unit 110 of the control unit 100.

The button name is an identifier for uniquely identifying the display button 42 contained in the button group. The display name is a character string displayed when the button is displayed on the information access unit 16. The color, the size, and the shape show the appearance of the button when the button is displayed on the information access unit 16. For example, the button color is black, the button size is large, and the button shape is rectangle 1.

The connection destination indicates the target displayed on the display 14 when the button is pressed. For example, a URL, a path to the location where the target of a file, etc., is retained, an IP address, etc., is registered. The user presses the display button 42 or clicks on the mouse button for entering a command to start a specific connection destination (for example, a Web page, an electronic file retained in the storage unit 110, any other electronic machine connected through the network 2, etc.).

Next, an outline of the invention will be discussed for easy understanding of the information processing apparatus 10 according to the embodiment.

To begin with, assignment of the target selected on any of the displays 14a to 14c to the display button 42 will be discussed.

Figure 5:
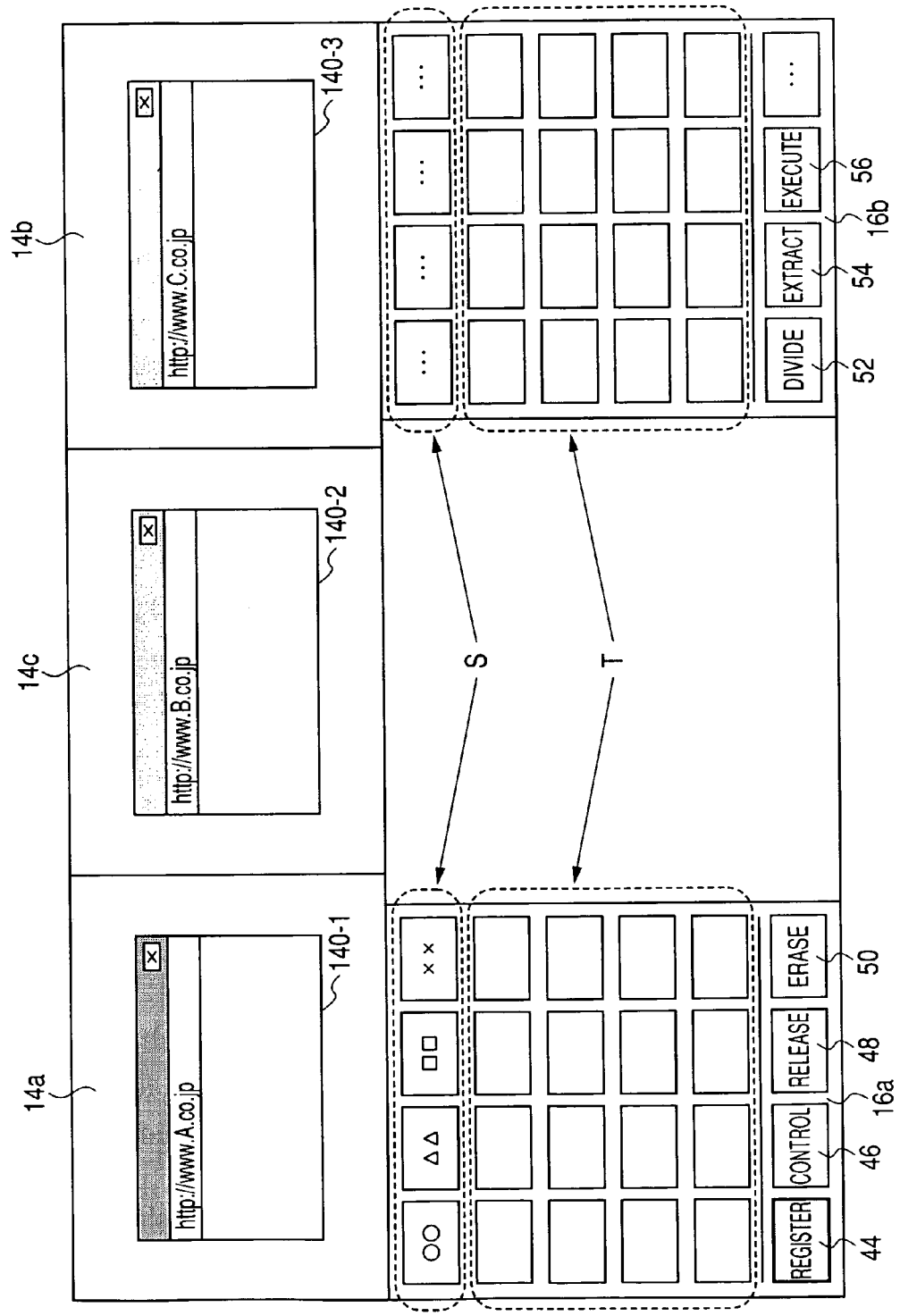
FIG. 5 is a drawing to show a state in which a register button is pressed and the display button enters a write preparation state.

FIG. 5 is a drawing to show a state in which the register button 44 is pressed and the display button 42 enters a write ready state.

As shown in FIG. 5, if the user presses the register button 44, each of the display buttons 42 enters either state of the write ready state and a write restriction state.

The write ready state is a state in which assignment of the target displayed on the display 14 is permitted. The display buttons 42 indicated by an arrow T in the figure are in the write ready state. When the display button 42 enters the write ready state, the appearance of the display button is changed by changing the button color, size, or shape or changing blinking. For example, when the display button 42 enters the write ready state, the button color is changed to blue.

The write restriction state is a state in which the target displayed on the display 14 cannot be assigned. The display buttons 42 indicated by an arrow S in the figure are in the write restriction state. When a target is already registered in the display button 42, if the user presses the register button 44, the display button 42 is placed in the write restriction state.

When the register button 44 is pressed, the appearance of the register button 44 is changed. Specifically, at least any of the color, the size, or the shape of the register button 44 is changed for display. For example, when the register button 44 is pressed, the color of the register button 44 is changed to yellow.

Figure 6:
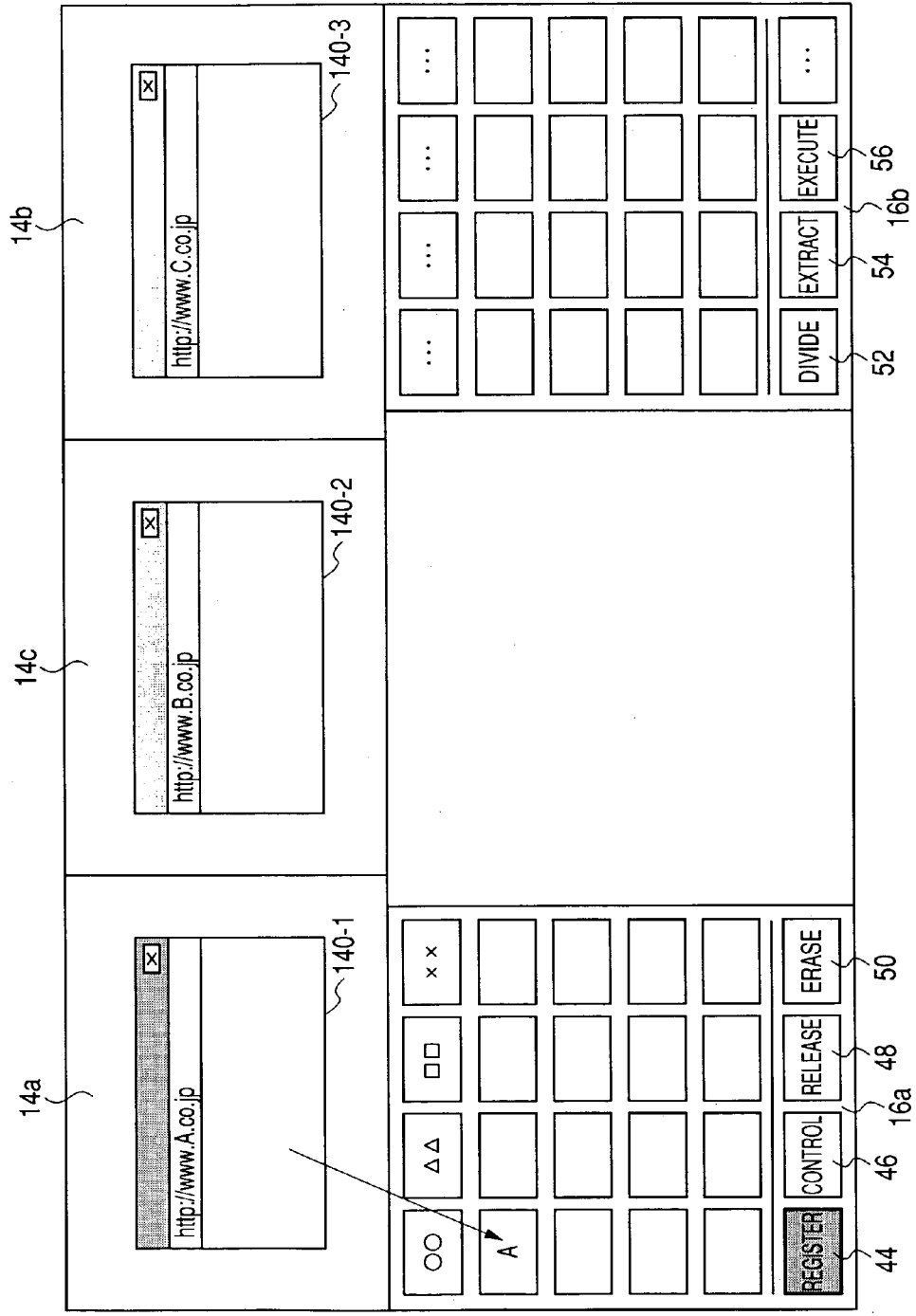
FIG. 6 is a drawing to describe assignment of a target to the display button as the register button is pressed.

FIG. 6 is a drawing to describe assignment of a target to the display button 42 as the register button 44 is pressed.

As shown in FIG. 6, if the user again presses the register button 44 in a state in which the display buttons 42 enter the write ready state as the register button 44 is pressed, the target is assigned to any of the display buttons 42 in the write ready state. The target to be assigned is the target displayed on any of the displays 14a to 14c and is the selected target. The selected target is also called the activated target.

To assign the target to the display button 42, the information processing apparatus 10 acquires information of the link path to the target. If the target is a Web page, the link path is the URL; if the target is an electronic file, the link path is the path to the storage location and the file name. The acquired information is registered in the button management table shown in FIG. 4. To assign the target to the display button 42, the information processing apparatus 10 may retain the most recent file of the target in a cache, etc.

When the target is assigned to the display button 42, a character string indicating the target is displayed. In the example, "A" indicating the home page of A company is displayed on the display button 42. After this, whenever the display button 42 is pressed, the assigned target is displayed on the display 14.

The display button 42 to which the target is assigned is selected in accordance with the preset priorities. For example, the display button 42 to which the target is assigned is selected in order from the top stage of the information access unit 16 to the bottom stage and from the left to the right. In the example, the target displayed on the display 14a, namely, the window 140-1 is assigned to the display button 42.

If the user again presses the register button 44 in a state in which the display buttons 42 enter the write ready state, the appearance of the register button 44 is again changed. For example, the color of the register button 44 is changed to red.

Figure 7:
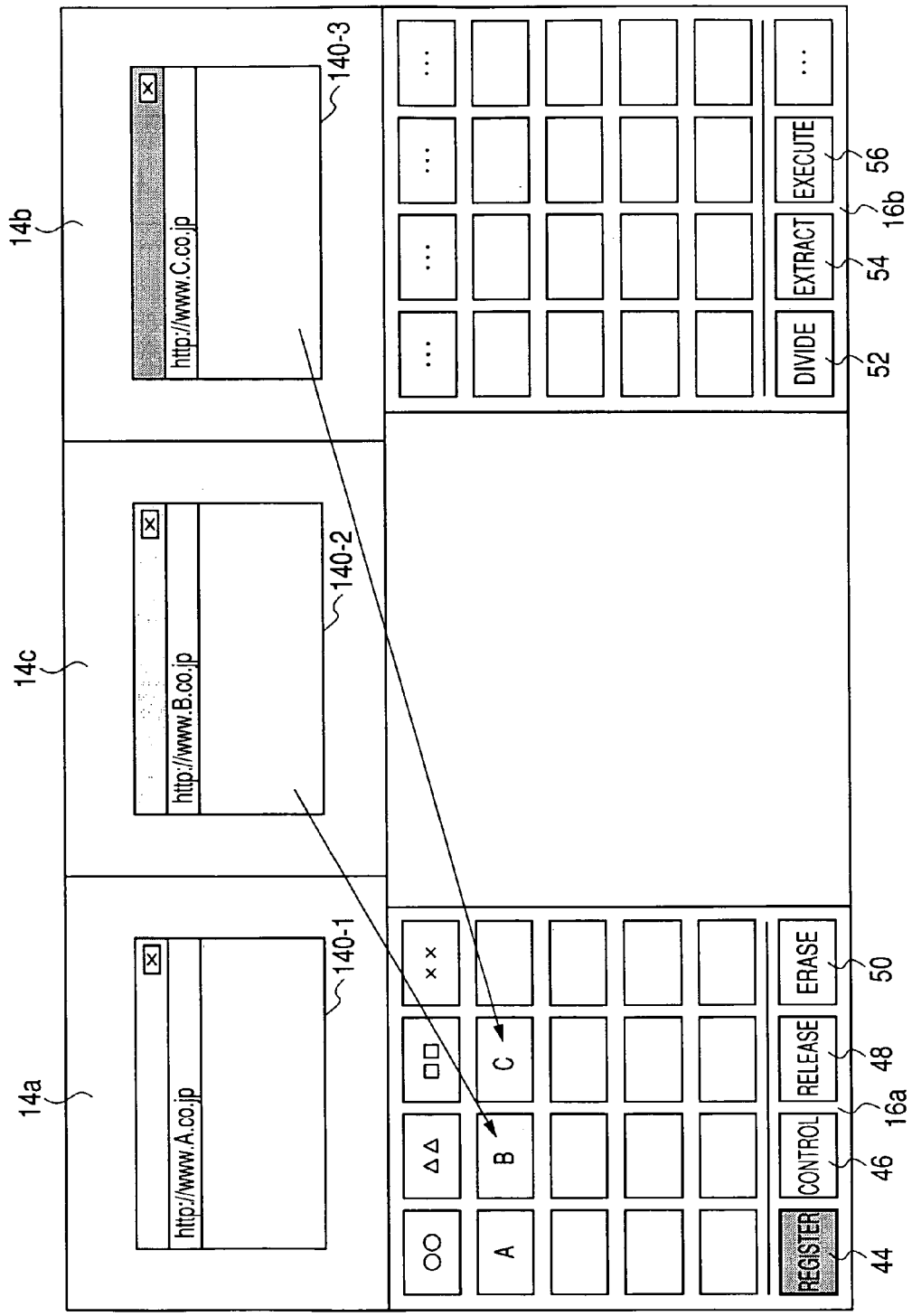
FIG. 7 is a drawing to describe successive assignment of the selected targets to the display buttons as the register button is pressed.

FIG. 7 is a drawing to describe successive assignment of the selected targets to the display buttons as the register button 44 is pressed.

As shown in FIG. 7, if the user again presses the register button 44 when the window 140-2 displayed on the display 14c is selected by mouse operation, etc., in a state in which the display buttons 42 enter the write ready state, the target corresponding to the window 140-2 is assigned to the display button 42. Further, if the user again presses the register button 44 when the window 140-3 displayed on the display 14b is selected, the target corresponding to the window 140-3 is assigned to the display button 42. Thus, if the display buttons 42 are in the write ready state, the selected targets are assigned to the display buttons 42 in order.

Since the information processing apparatus 10 includes a plurality of control units 100a to 100e and a plurality of displays 14a to 14c, an activated window may exist on each of the displays 14a to 14c.

Figure 8:
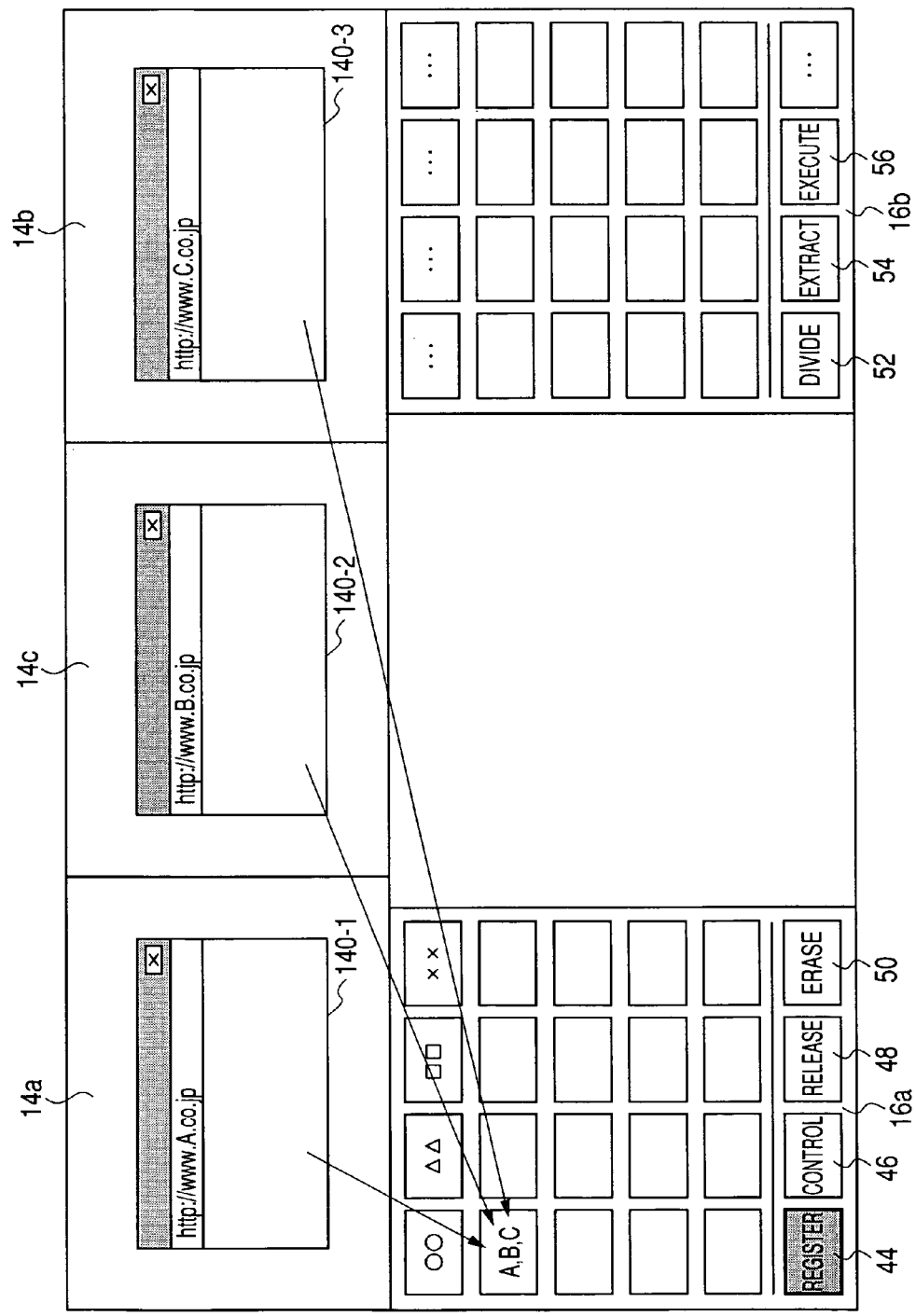
FIG. 8 is a drawing to describe assignment of a plurality of targets to the display buttons as the register button is pressed.

FIG. 8 is a drawing to describe assignment of a plurality of targets to the display buttons 42 as the register button 44 is pressed.

As shown in FIG. 8, when the activated windows 140-1 to 140-3 exist on the displays 14a to 14c, if the user again presses the register button 44 in a state in which the display buttons 42 enter the write ready state, the targets corresponding to the windows 140-1 to 140-3 are assigned to one display button 42 in the write ready state.

When a plurality of targets are assigned to the display button 42, a character string indicating the targets is displayed. In the example, "A, B, C" indicating the home pages of A company, B company, and C company is displayed on the display button 42. After this, whenever the display button 42 is pressed, the assigned targets, namely, the home pages of A company, B company, and C company are displayed on the displays 14a to 14c. At this time, the targets may be displayed on the different displays 14a to 14c.

Thus, the information processing apparatus 10 sets specification to display a plurality of targets in one display button 42. Thus, the user can display a plurality of targets on the display 14 by pressing one display button 42 to which the targets are assigned.

In the information processing apparatus 10, when a plurality of targets are activated, the targets can also be assigned to different display buttons 42 by simple operation.

Figure 9:
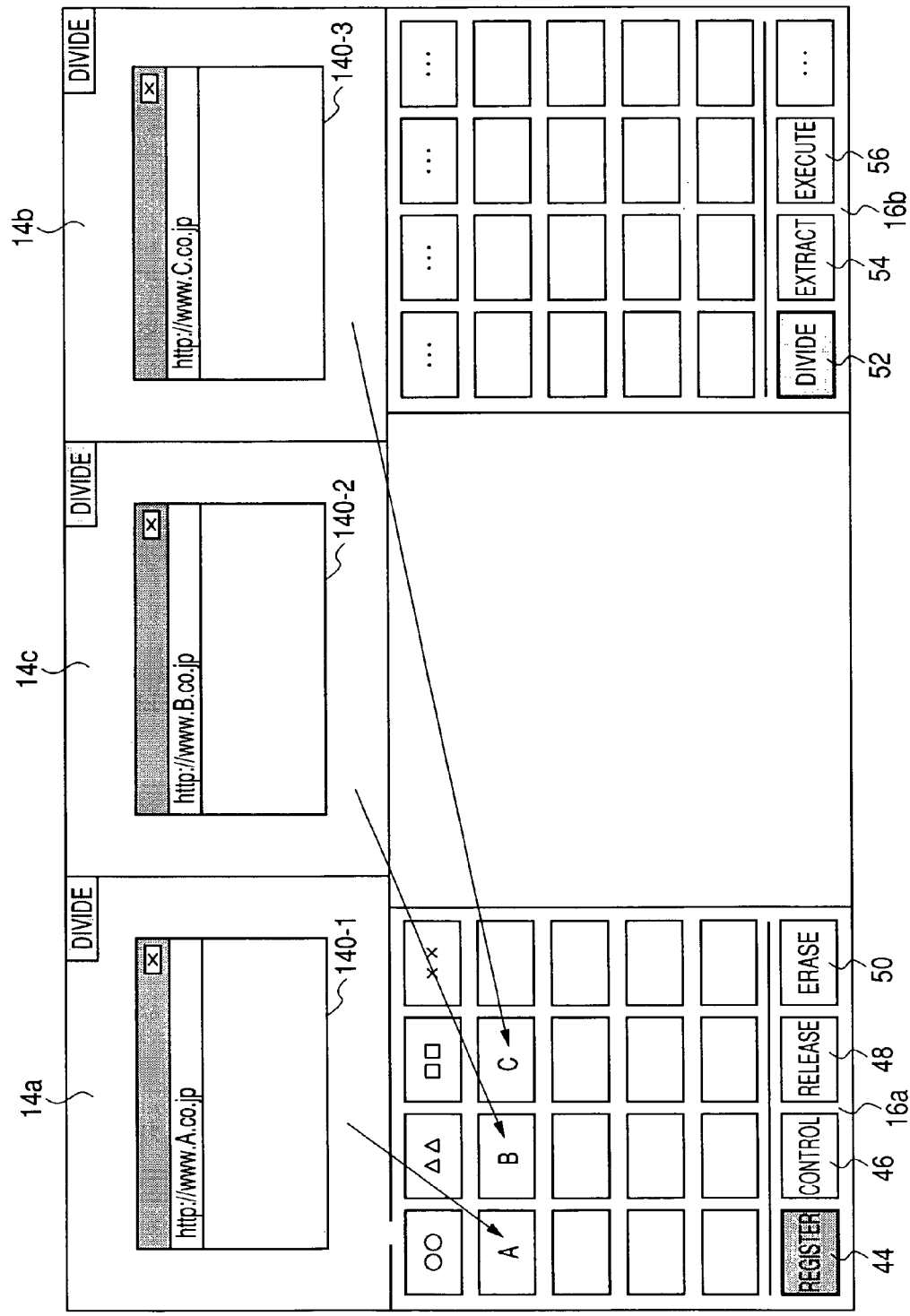
FIG. 9 is a drawing to describe assignment of a plurality of targets to different display buttons as the register button and a divide button are pressed.

FIG. 9 is a drawing to describe assignment of a plurality of targets to different display buttons 42 as the register button 44 and the divide button 52 are pressed.

As shown in FIG. 9, if the user presses the divide button 52 in a state in which the display buttons 42 enter the write ready state with the register button 44 pressed, the display buttons 42 enter a divide write ready state. If the user again presses the register button 44 in a state in which a plurality of targets are activated and the display buttons 42 enter the divide write ready state, the targets are assigned to different display buttons 42.

If the user presses the divide button 52 in a state in which the display buttons 42 enter the write ready state, the appearance of the divide button 52 is changed. For example, the color of the divide button 52 is changed to yellow.

In the divide write ready state, the fact that the apparatus is in the divide write ready state may be displayed on the displays 14a to 14c. In the example, state indications 142-1 to 142-3 indicating "divide" are displayed in the upper right corners of the displays 14a to 14c.

If the user again presses the divide button 52 in the divide write ready state, the display buttons 42 make a transition from the divide write ready state to the usual write ready state. Here, the usual write ready state is also called collective write ready state. In the collective write ready state, the fact that the apparatus is in the collective write ready state may be displayed on the displays 14a to 14c. For example, state indications indicating "collective" are displayed in the upper right corners of the displays 14a to 14c. The state indication of either of "divide" and "collective" is thus displayed on the display 14, whereby the user can effectively recognize the current state and can perform assignment operation more efficiently.

In the assignment operation of the information processing apparatus 10, the user can select the display button 42 to which a target is assigned as desired.

Figure 10:
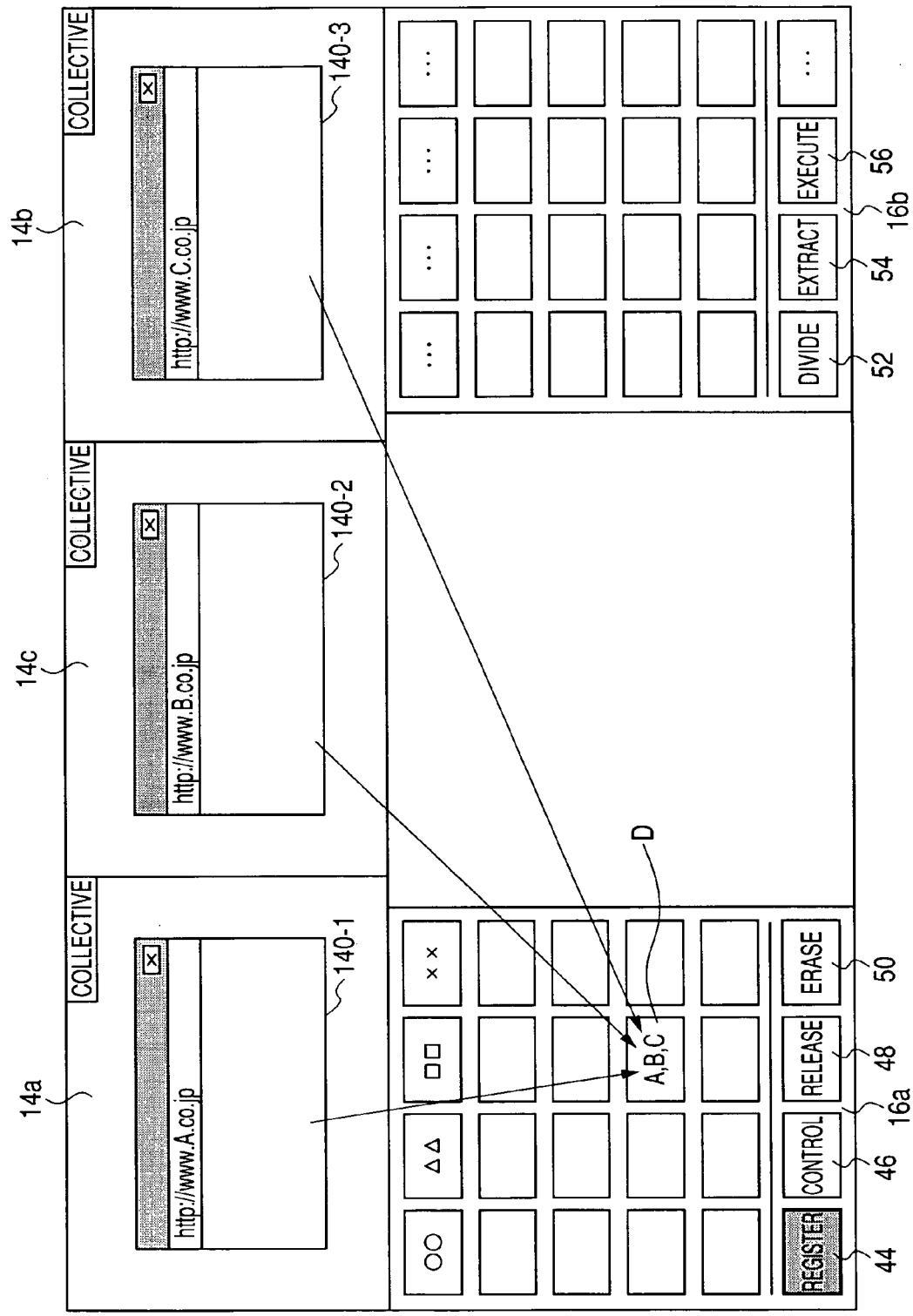
FIG. 10 is a drawing to describe target assignment to the selected display button.

FIG. 10 is a drawing to describe target assignment to the selected display button 42.

As shown in FIG. 10, if the user again presses the register button 44 after pressing and selecting any display button 42 (for example, a D button in the figure) in a state in which the display buttons 42 enter the write ready state with the register button 44 pressed, the target is assigned to the selected display button 42. One or two or more targets may be assigned. Thus, the user can assign the target to the display button 42 at an easy place for the user to operate, and ease of operation is more enhanced.

Figure 11:
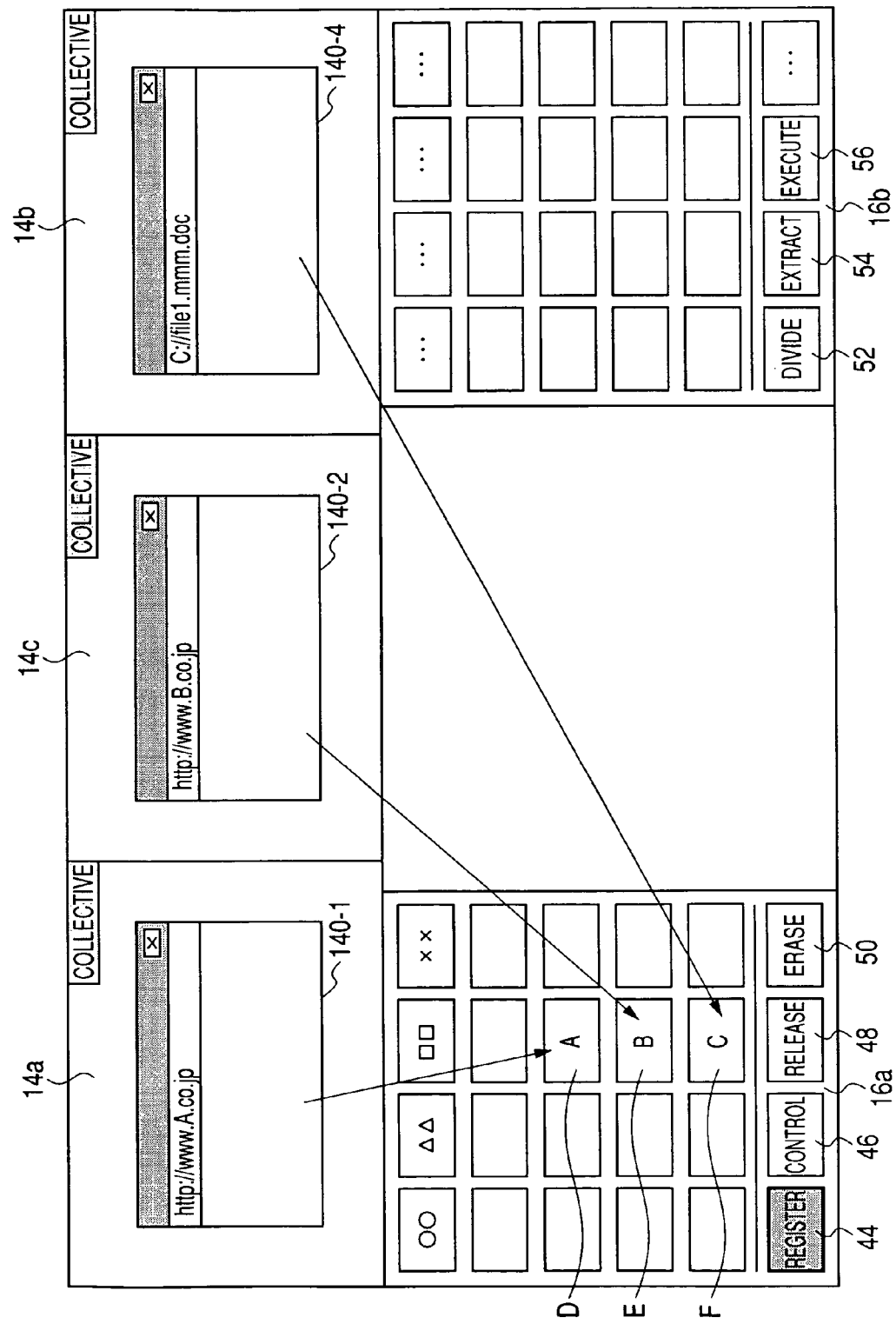
FIG. 11 is a drawing to describe target assignment to a plurality of selected display buttons.

FIG. 11 is a drawing to describe target assignment to a plurality of selected display buttons 42.

As shown in FIG. 11, when the activated windows 140-1 to 140-3 exist on the displays 14a to 14c, if the user again presses the register button 44 after pressing and selecting a plurality of display buttons 42 (for example, a D button, an E button, and an F button in the figure) in a state in which the display buttons 42 enter the write ready state, the targets corresponding to the windows 140-1 to 140-3 are assigned to the selected display buttons 42 in order. In the example, the home page of A company, the home page of B company, and an electronic file C are assigned to the D button, the E button, and the F button.

In the assignment operation of the information processing apparatus 10, the user can assign a plurality of targets contained in a selected work set to the display button 42 by simple operation.

Figure 12:
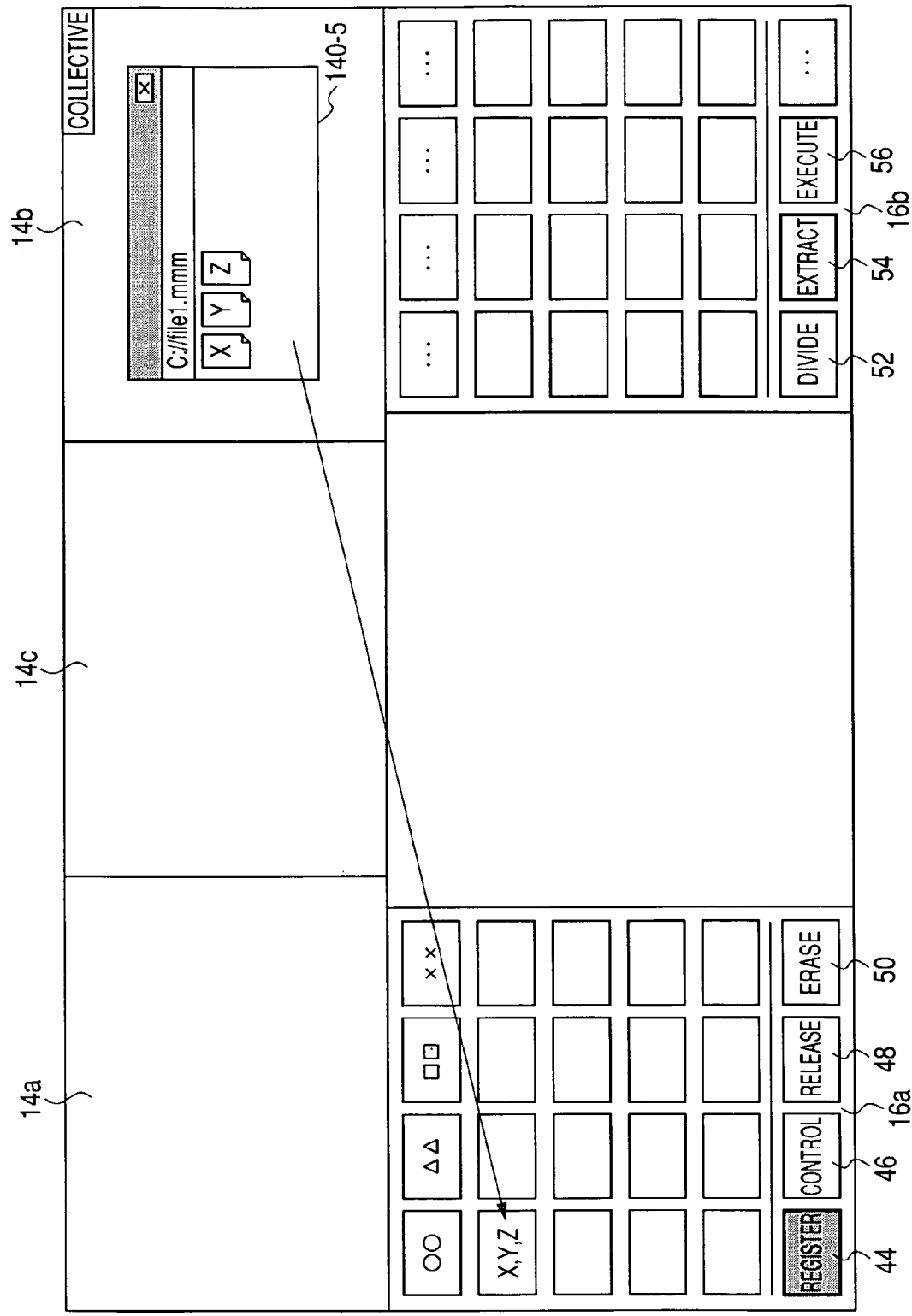
FIG. 12 is a drawing to describe assignment of a plurality of targets contained in a selected work set to the display button.

FIG. 12 is a drawing to describe assignment of a plurality of targets contained in a selected work set to the display button 42.

As shown in FIG. 12, when an activated work set 140-5 exists on the displays 14a to 14c, if the user again presses the register button 44 after pressing the extract button 54 in a state in which the display buttons 42 enter the write ready state, a plurality of targets contained in the work set are assigned to one display button 42. For example, the work set is a folder and the plurality of targets are electronic files. If the user again presses the register button 44 without pressing the extract button 54, the work set 140-5 is assigned to the display 42.

If the user presses the extract button 54 in a state in which the display buttons 42 enter the write ready state, the appearance of the extract button 54 is changed. For example, the color of the extract button 54 is changed to yellow.

Figure 13:
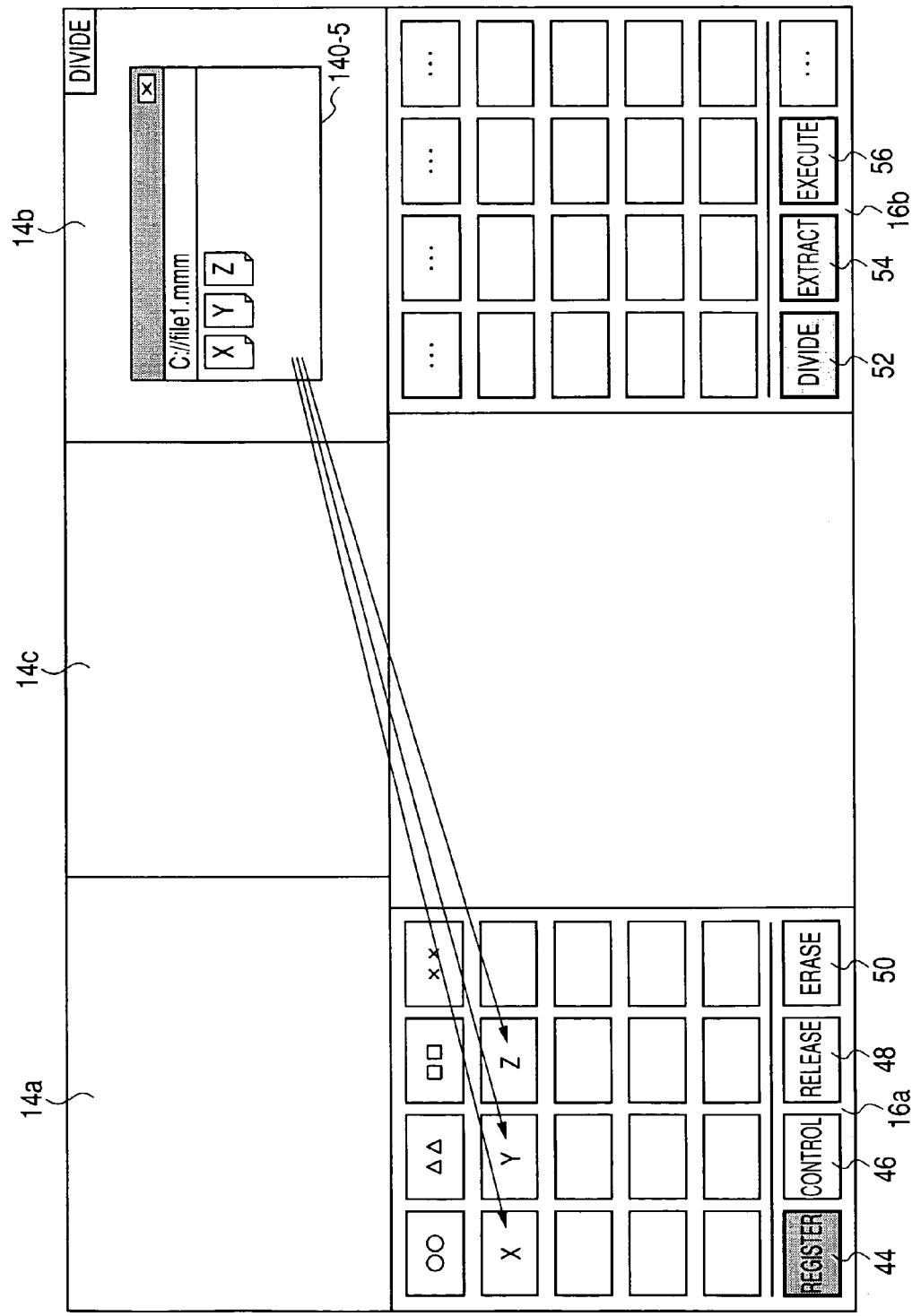
FIG. 13 is a drawing to describe assignment of a plurality of targets contained in a selected work set to different display buttons as an extract button and the divide button are pressed.

FIG. 13 is a drawing to describe assignment of a plurality of targets contained in a selected work set to different display buttons 42 as the extract button 54 and the divide button 52 are pressed.

As shown in FIG. 13, if the user again presses the register button 44 after pressing the divide button 52 in addition to the extract button 54 in a state in which the display buttons 42 enter the write ready state, a plurality of targets contained in the work set are assigned to different display buttons 42.

Next, the execute button 56 and the release button 48 will be discussed in detail.

The execute button 56 is a button for executing assignment operation as the button is pressed in a state in which the display buttons 42 enter the write ready state. Thus, the assignment is executed as the user presses either of the register button 44 and the execute button 56 in the write ready state.

If the user presses the release button 48 in a state in which the display buttons 42 enter the divide write ready state with the divide button 52 pressed, the divide write ready state is released and the state is restored to the usual write ready state (collective write ready state). If the user presses the release button 48 with the extract button 54 pressed, the state in which the targets contained in the work set are extracted is released and the state is restored to the usual write ready state (state in which the work set is assigned).

Next, control of the write ready state and the write restriction state of the display buttons 42 as the control button 46 is pressed will be discussed.

When the control button 46 is pressed, a state in which the state of the display buttons 42 can be changed (write change state) is entered. If the user presses any display button 42 in the write change state, the state of the display button 42 is changed to the opposite state. Specifically, if the display button 42 is assignable, the display button 42 becomes unassignable; if the display button 42 is unassignable, the display button 42 becomes assignable. If a target is already assigned to the display button 42, when the display button 42 becomes assignable, the target is assigned to the display button 42 in an overwrite mode.

If the user presses the release button 48 in the write change state, the write change state is released. The user may release the write change state by again pressing the control button 46.

Figure 14:
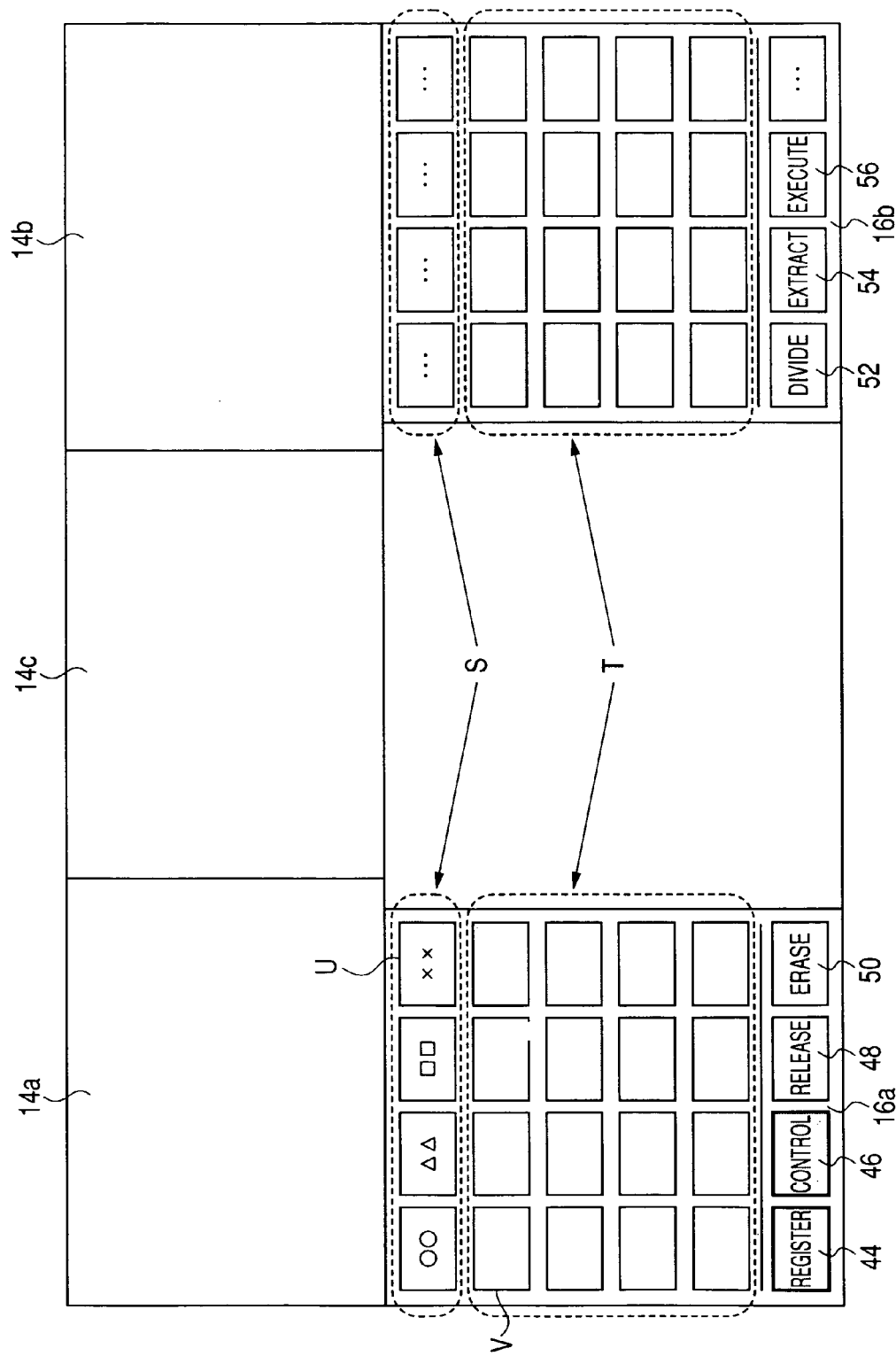
FIG. 14 is a drawing to describe control of the state of the display buttons as a control button is pressed.

FIG. 14 is a drawing to describe control of the state of the display buttons 42 as the control button 46 is pressed.

As shown in FIG. 14, although the display buttons 42 indicated by an arrow S in the figure are in the write restriction state, if the user presses the control button 46 and then presses a button U, a target is newly assigned to the button U. Likewise, although the display buttons 42 indicated by an arrow T in the figure are in the write ready state, if the user presses the control button 46 and then presses a button V, etc., a target is not assigned to the button V, etc.

Next, erasion of the assignment description of the display buttons 42 as the erase button 50 is pressed will be discussed.

The information processing apparatus 10 allows the user to erase the description assigned to each display button 42. When the erase button 50 is pressed, a state in which the description assigned to each display button 42 can be erased is entered. The state is also called erasable state. If the user presses an already assigned display button 42 in the erasable state, the description assigned to the display button 42 is erased.

If the user presses the release button 48 in the erasable state, the erasable state is released. The user may release the erasable state by again pressing the erase button 50.

Figure 15:
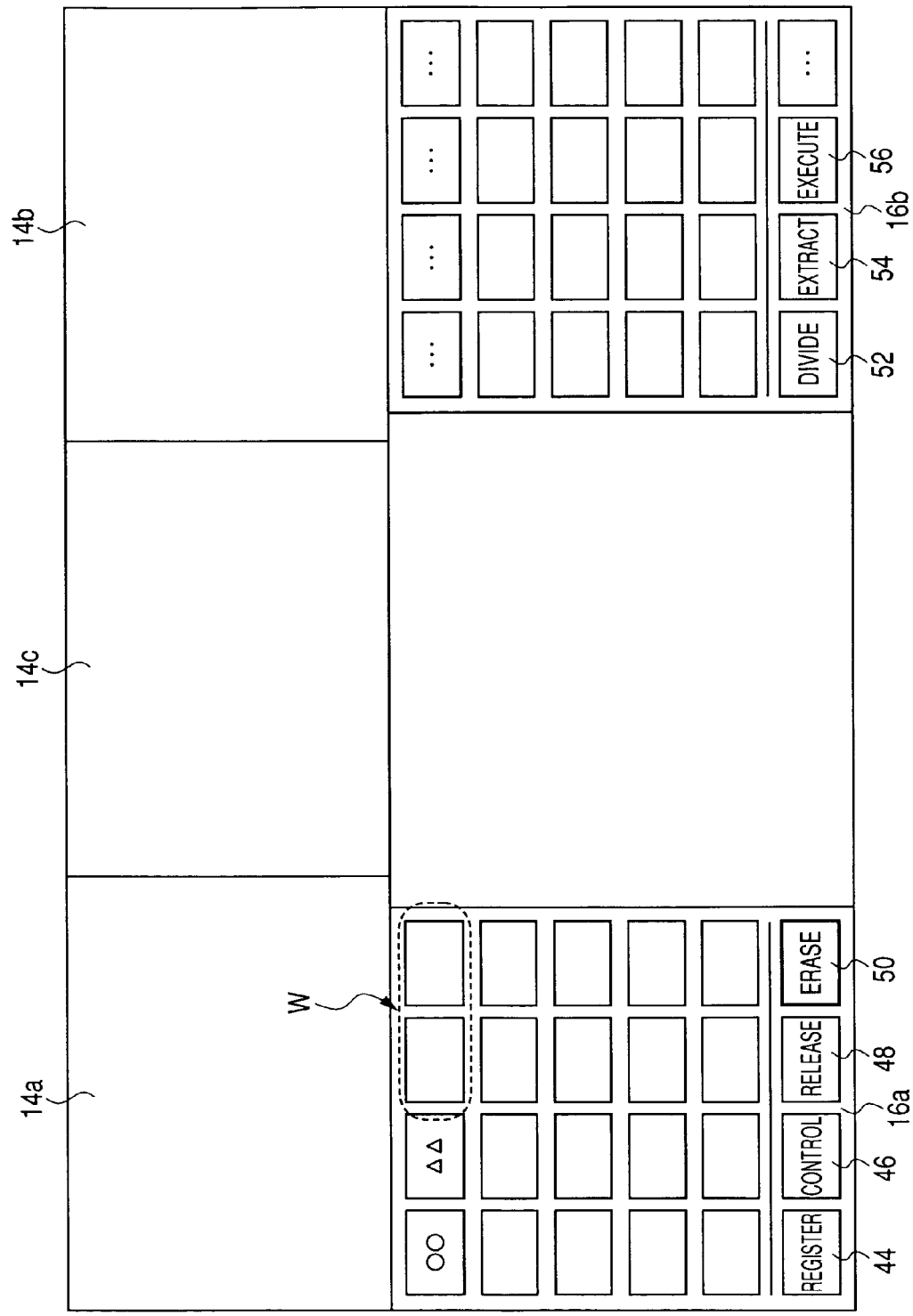
FIG. 15 is a drawing to describe erasion of the registration descriptions of the display buttons as an erase button is pressed.

FIG. 15 is a drawing to describe erasion of the registration descriptions of the display buttons 42 as the erase button 50 is pressed.

As shown in FIG. 15, if the user presses the display buttons 42 (for example, the two buttons contained in a range W in the figure) after pressing the erase button 50, the descriptions assigned to the display buttons 42 are erased. The character strings displayed on the display buttons 42 are also deleted.

When the assignment operation and the erasion operation described above are executed, data is registered in and is deleted from the button management table shown in FIG. 4 as for the operated buttons.

Thus, a target is assigned to or is erased from each of the display buttons 42 of the information access units 16 in response to user operation. The registration descriptions are managed in the information processing apparatus 10 and are changed according to the assignment operation and the erasion operation.

Next, automatic target assignment executed by the information processing apparatus 10 will be discussed.

The information processing apparatus 10 according to the embodiment stores user information and assigns the target retrieved based on the user information to any display button 42. More specifically, the user previously enters an interesting keyword into the information processing apparatus 10, which then stores the keyword for each user. The information processing apparatus 10 searches Web pages based on the stored keyword at regular time intervals through the Internet, for example, and assigns the found Web page to any display button 42. The display button 42 to which the found Web page is assigned is a button to which a target is not yet assigned. The information processing apparatus 10 changes the appearance of the display button 42 for display, informing the user that new information has been assigned to the display button 42. For example, the information processing apparatus 10 changes the color, the size, or the shape of the display button 42 or blinks the display button 42.

In the search processing, a search engine open to the public on the Web may be used. The information processing apparatus 10 may limit the display buttons 42 to which targets are automatically assigned to the display buttons 42 in a predetermined region.

Figure 16:
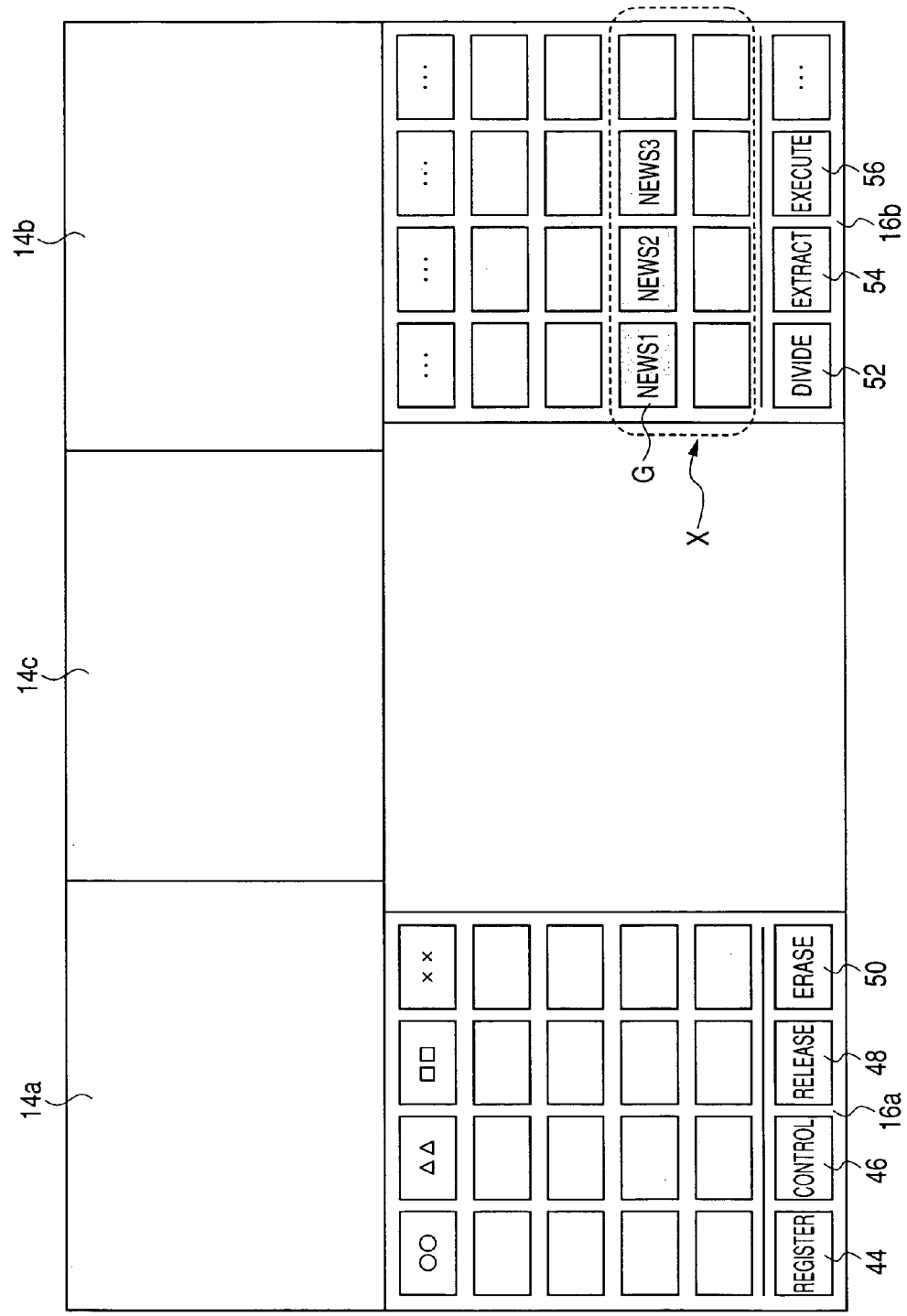
FIG. 16 is a drawing to illustrate the targets assigned to the display buttons by automatic assignment.

FIG. 16 is a drawing to illustrate the targets assigned to the display buttons 42 by automatic assignment.

As illustrated in FIG. 16, three display buttons 42 (G in the figure) are buttons to which the Web pages retrieved based on the keyword registered by the user are assigned. In the example, the Web pages of news 1 to news 3 are assigned to the display buttons 42. For example, the color of the display buttons 42 is changed to red for display. An arrow X in the figure indicates an automatically assignable region.

The Web search processing described above is processing of searching newspaper articles on the day every morning at a predetermined newspaper article search site and automatically registering the URL for displaying the article relevant to the registered keyword in the display button 42, for example. If the user presses the display button 42 to which the URL (Web page) is automatically assigned and views the Web page, the information processing apparatus 10 may automatically erase the registration description of the display button 42 or may automatically change the display button 42 from unassignable to assignable.

Further, the information processing apparatus 10 may automatically extract a keyword from the words entered by the user. For example, the information processing apparatus 10 extracts a keyword based on the entered words in a past given time period counting from the automatic search execution date (for example, for one week). The information processing apparatus 10 may extract frequently occurring words as keywords; for example, it extracts the high-order three words of the words entered in a predetermined time period as keywords.

The information processing apparatus 10 may extract a keyword based on the words contained in the targets specified and displayed through the display buttons 42 by the user (for example, electronic files) in a past given time period counting from the automatic search execution date (for example, for one week), for example. At this time, the information processing apparatus 10 may extract frequently occurring words as keywords; for example, it extracts the high-order three words as keywords.

Next, a button management program 200 for implementing the assignment method and the display method of the information processing apparatus 10 described above will be discussed.

Figure 17:
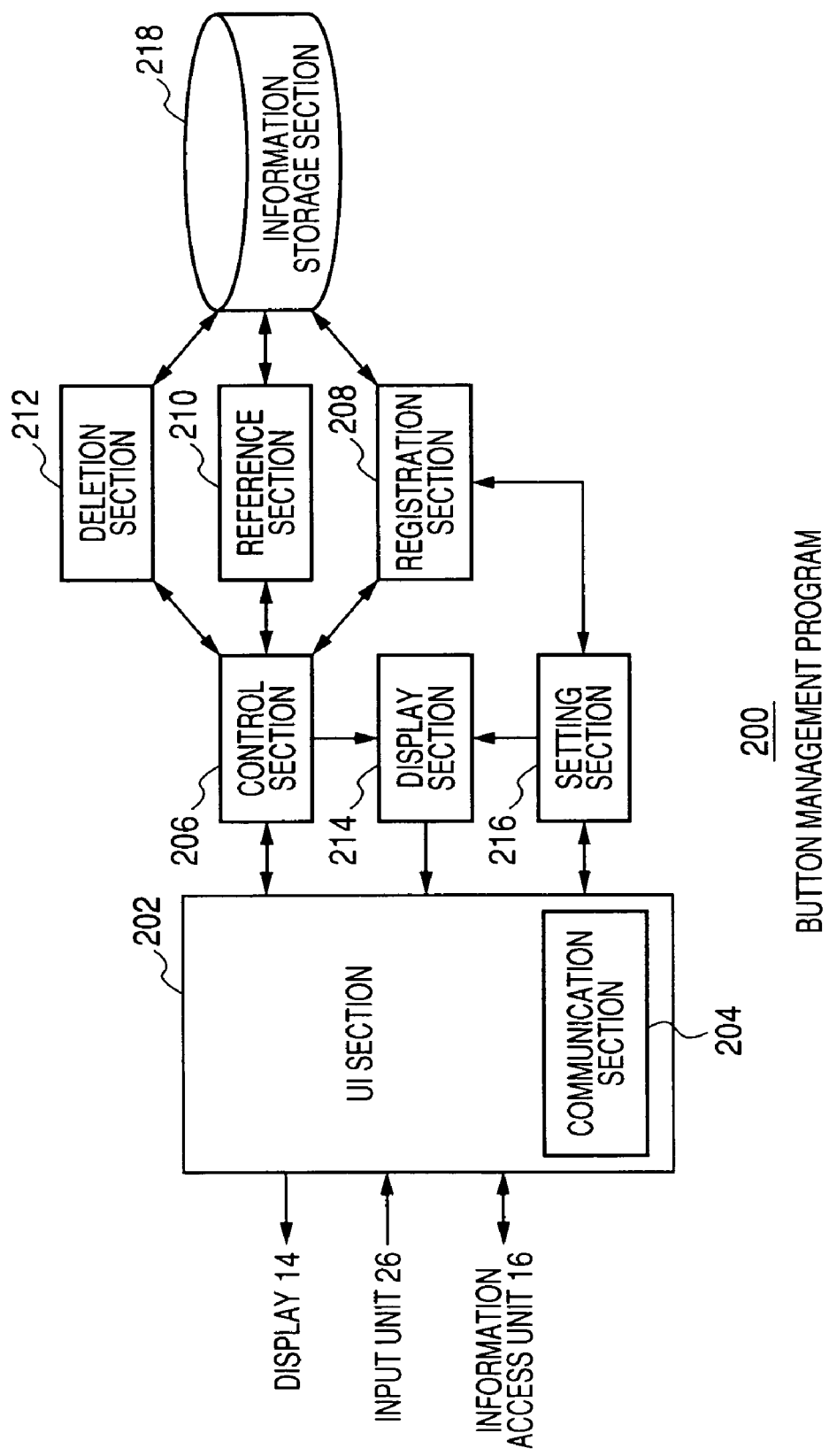
FIG. 17 is a block diagram to show the configuration of a button management program executed by a control unit of the information processing apparatus.

FIG. 17 is a block diagram to show the configuration of the button management program 200 executed by the control unit 100 (FIG. 2) of the information processing apparatus 10.

As shown in FIG. 17, the button management program 200 has a user interface (UI) section 202, a communication section 204, a control section 206, a registration section 208, a reference section 210, a deletion section 212, a display section 214, a setting section 216, and an information storage section 218. The button management program 200 accepts a target selected on at least any of the displays 14a to 14c and assigns the accepted target to any display button 42 by the components. The button management program 200 also accepts specification of a plurality of targets through the display buttons 42 and displays the accepted targets on at least any of the displays 14a to 14c. Thus, the button management program 200 implements assignment unit and display control unit.

The button management program 200 is supplied to the processor 102 through the network 2, the communication IF 108 (FIG. 2), etc., for example, and is loaded into the memory 106 and further is executed using hardware specifically on an OS operating in the processor 102. The button management program 200 may be executed in all control units 100a to 100e or may be executed in any of the control units 100.

In the button management program 200, the UI section 202 accepts user's operation of the information access unit 16 and the input unit 26 and outputs to the components described later. The user's operation includes pressing the button 18 (also containing mouse click), etc. The UI section 202 displays information created in the display section 214 (image data, etc.), the processing descriptions of the components, etc., described later on the display 14 and the information access unit 16.

The communication section 204 inputs/outputs data through the communication IF 108 and controls transmission and reception of data in the information processing apparatus 10 through the relay unit 112 and transmission and reception of data to and from an external computer through the network 2. The communication section 204 may perform encryption processing to prevent tampering of information and data to be transmitted.

The information storage section 218 stores the button management table shown in FIG. 4, the most recent file of the target (Web page, etc.) specified by operating the display button 42, an electronic file of document preparation software or spreadsheet software, and the like. The information storage section 218 implements user information storage unit for storing user information. The information storage section 218 is implemented as the storage unit 110 (FIG. 2) and the memory 106.

The control section 206 accepts an entry made by the user pressing the function buttons such as the display button 42 and the register button 44 through the UI section 202 and controls other components for performing predetermined operation. If the control section 206 accepts assignment operation of a target to the display button 42 through the register button 44, etc., it controls the registration section 208 (described later) for registering the data corresponding to the accepted entry in the button management table stored in the information storage section 218. To register a plurality of targets, the control section 206 registers the targets in one display button 42 or different display buttons 42 in response to the pressed function button, etc.

If the control section 206 accepts erasure of the description assigned to the display button 42 through the erase button 50, it controls the deletion section 212 (described later) for deleting the data corresponding to the accepted entry from the button management table stored in the information storage section 218.

Further, if the control section 206 accepts display of a target on the display 14 through the display button 42, it references the button management table stored in the information storage section 218 through the reference section 210 and acquires the data relevant to the accepted target. The control section 206 controls the display section 214 for displaying the specified target on the display 14 as a window. To specify a plurality of targets through the display buttons 42, the control section 206 acquires the data relevant to the targets and display a plurality of windows on the display 14.

If the function button, etc., is pressed, the control section 206 controls the display section 214 to change the appearance of the function button for display on the information access unit 16a, 16b.

The registration section 208 assigns one or more targets to the display button 42 based on the information accepted from the control section 206 and registers the data of the display button 42 in the button management table (FIG. 4).

The reference section 210 searches the button management table stored in the information storage section 218 for the target corresponding to the specified display button 42 (Web page, electronic file, etc.) and the appearance, etc., of the display button 42 based on the information specified from the control section 206, and outputs them to the control section 206.

The deletion section 212 deletes the data of the display button 42 stored in the information storage section 218 based on the information accepted from the control section 206.

The display section 214 displays the target specified through the display button 42 on the display 14 under the control of the control section 206. The display processing includes widow display of application software for executing jobs (spreadsheet software, document preparation software, teleconferencing software, etc.), display of a Web page, etc., for example.

The display section 214 displays the function buttons such as the display buttons 42 and the register button 44 on the information access unit 16 as the appearance of each button specified for the control section 206 (color, size, shape, etc.). Further, when the setting section 216 (described later) executes automatic target assignment processing to the display button 42, the display section 214 accepts the appearance data of the display button 42 from the setting section 216 and changes the appearance of the display button 42 for display on the information access unit 16.

The setting section 216 controls the automatic target assignment processing to the display button 42. More specifically, the setting section 216 stores the keyword entered by the user using the input unit 26 or the information access unit 16 for each user and searches Web pages based on the keyword of the user at a predetermined timing. For example, the setting section 216 executes search processing at 7 o'clock every day.

The setting section 216 controls the registration section 208 for storing the found Web page in the button management table stored in the information storage section 218 and assigns the Web page to the display button 42. Further, the setting section 216 controls the display section 214 for changing the appearance of the display button 42 to which the Web page is assigned for display on the information access unit 16.

Figure 18:
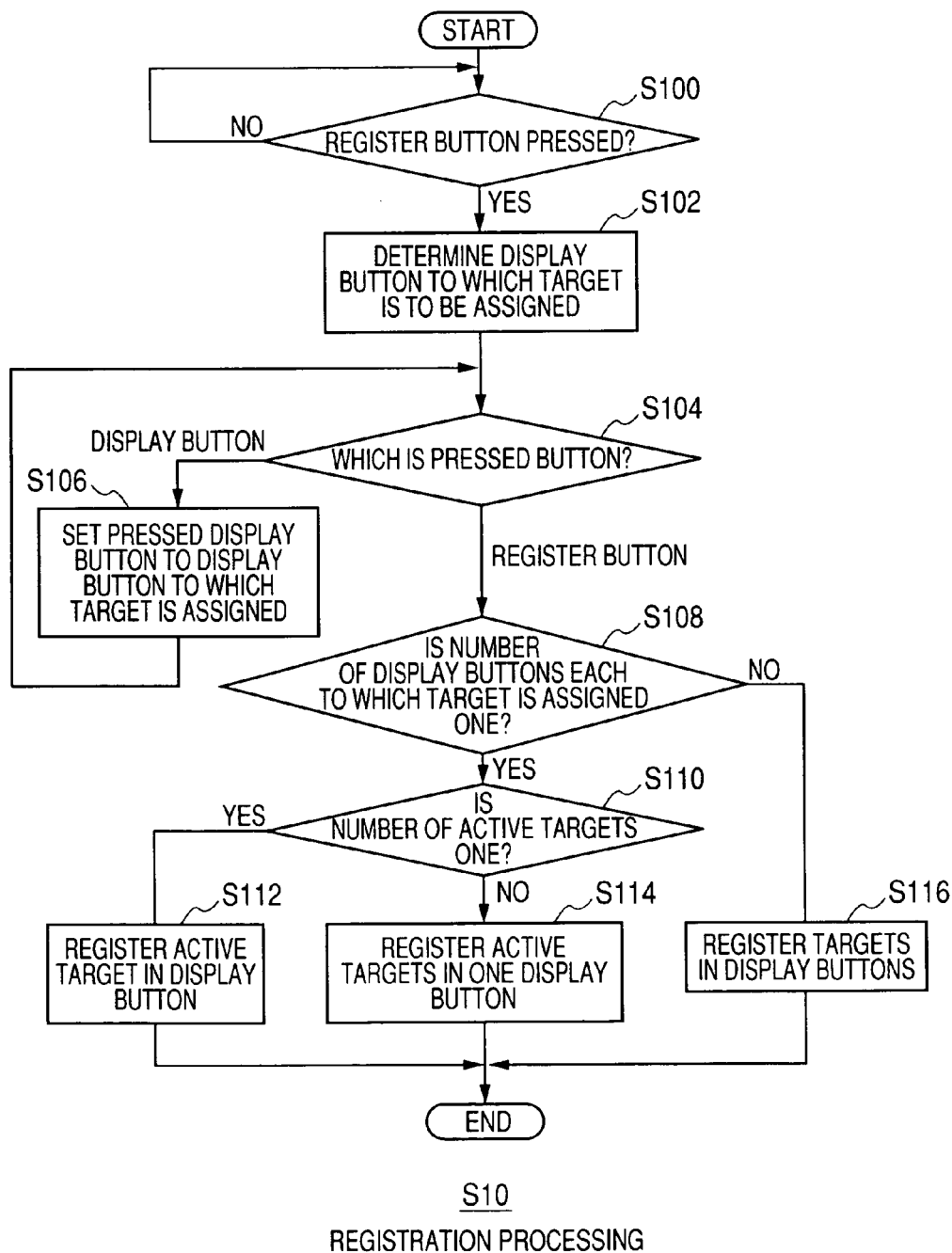
FIG. 18 is a flowchart to show registration processing in the information processing apparatus.

FIG. 18 is a flowchart to show registration processing (S10) in the information processing apparatus 10.

As shown in FIG. 18, at step 100 (S100), the control section 206 of the button management program 200 (FIG. 17) determines whether or not the user presses the register button 44 of the information access unit 16. If the user presses the register button 44, the control section 206 proceeds the process to S102; otherwise, the control section 206 returns the process to S100.

At step 102 (S102), the control section 206 controls the display section 214 for changing the appearance of the register button 44 for display on the information access unit 16. The control section 206 also determines the display button 42 to which the target is to be assigned. The control section 206 selects the display button 42 in accordance with predetermined priorities. For example, the display button 42 placed at the higher stage of the information access unit 16, the higher priority assigned; the display button 42 placed more at the left, the higher priority assigned.

At step 104 (S104), the control section 206 determines whether the subsequently pressed button is the display button 42 or the register button 44. If the display button 42 is pressed, the control section 206 proceeds the process to S106; if the register button 44 is again pressed, the control section 206 proceeds the process to S108.

At step 106 (S106), the control section 206 changes the display button 42 to which the target is assigned from the display button 42 determined in accordance with the predetermined priorities at S102 to the display button 42 pressed by the user.

At step 108 (S108), the control section 206 controls the display section 214 for furthermore changing the appearance of the register button 44. The control section 206 determines whether or not the number of the display buttons 42 each to which the target is assigned is one. If the number of the display buttons 42 each to which the target is assigned is one, the control section 206 proceeds the process to S110; if the user selects a plurality of display buttons 42 at S106, the control section 206 proceeds the process to S116.

At step 110 (S110), the control section 206 determines whether or not the number of active targets (windows) when the register button is again pressed is one. If the number of active targets is one, the control section 206 proceeds the process to S112; otherwise, the control section 206 proceeds the process to S114.

At step 112 (S112), the control section 206 assigns the active target to one display button 42 and registers the data of the target in the button management table stored in the information storage section 218 through the registration section 208. The control section 206 controls the display section 214 for displaying the character string representing the target on the display button 42.

At step 114 (S114), the control section 206 assigns the active targets to one display button 42 and registers the data in the button management table through the registration section 208. Here, the URLs, etc., of the plurality of targets are stored in the item "connection destination" in the button management table. The control section 206 controls the display section 214 for displaying the character string representing the plurality of targets on the display button 42.

At step 116 (S116), the control section 206 assigns the active targets to different display buttons 42 and registers the data of the display buttons 42 in the button management table through the registration section 208. Here, the data of the display buttons 42 is newly registered in the button management table. The control section 206 controls the display section 214 for displaying the corresponding character strings on the display buttons 42.

Figure 19:
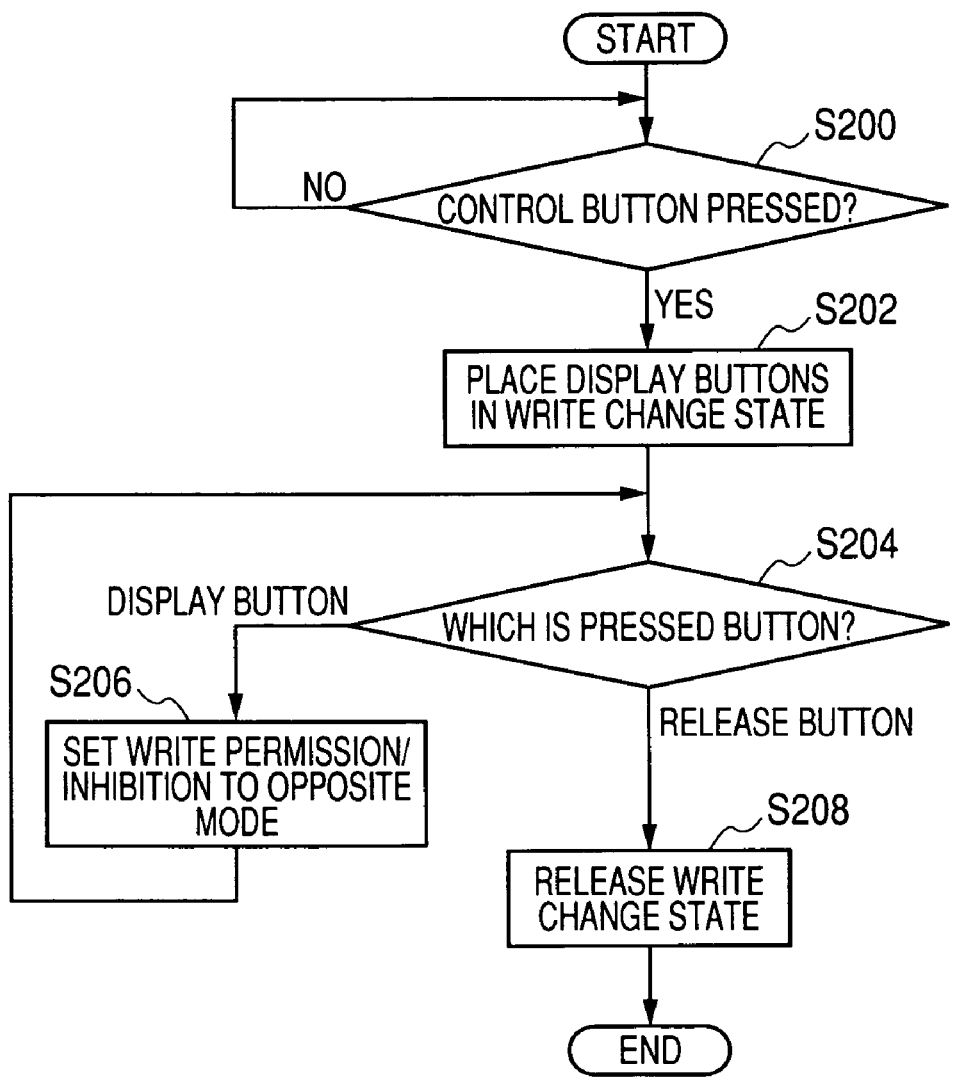
FIG. 19 is a flowchart to show write restriction setting processing in the information processing apparatus.

FIG. 19 is a flowchart to show write restriction setting processing (S20) in the information processing apparatus 10.

As shown in FIG. 19, at step 200 (S200), the control section 206 of the button management program 200 determines whether or not the user presses the control button 46 of the information access unit 16. If the user presses the control button 46, the control section 206 proceeds the process to S202; otherwise, the control section 206 returns the process to S200.

At step 202 (S202), the control section 206 places the display buttons 42 in the write change state. The control section 206 controls the display section 214 for changing the appearance of the control button 46 for display.

At step 204 (S204), the control section 206 determines whether the subsequently pressed button is the display button 42 or the release button 48. If the display button 42 is pressed, the control section 206 proceeds the process to S206; if the release button 48 is pressed, the control section 206 proceeds the process to S208. At this time, if the control button 46 is again pressed, the control section 206 may proceed the process to S208.

At step 206 (S206), if the display button 42 is assignable, the control section 206 changes the display button 42 to unassignable; if the display button 42 is unassignable, the control section 206 changes the display button 42 to assignable.

At step 208 (S208), the control section 206 releases the write change state. The control section 206 controls the display section 214 for restoring the appearance of the control button 46 to the usual appearance for display.

Figure 20:
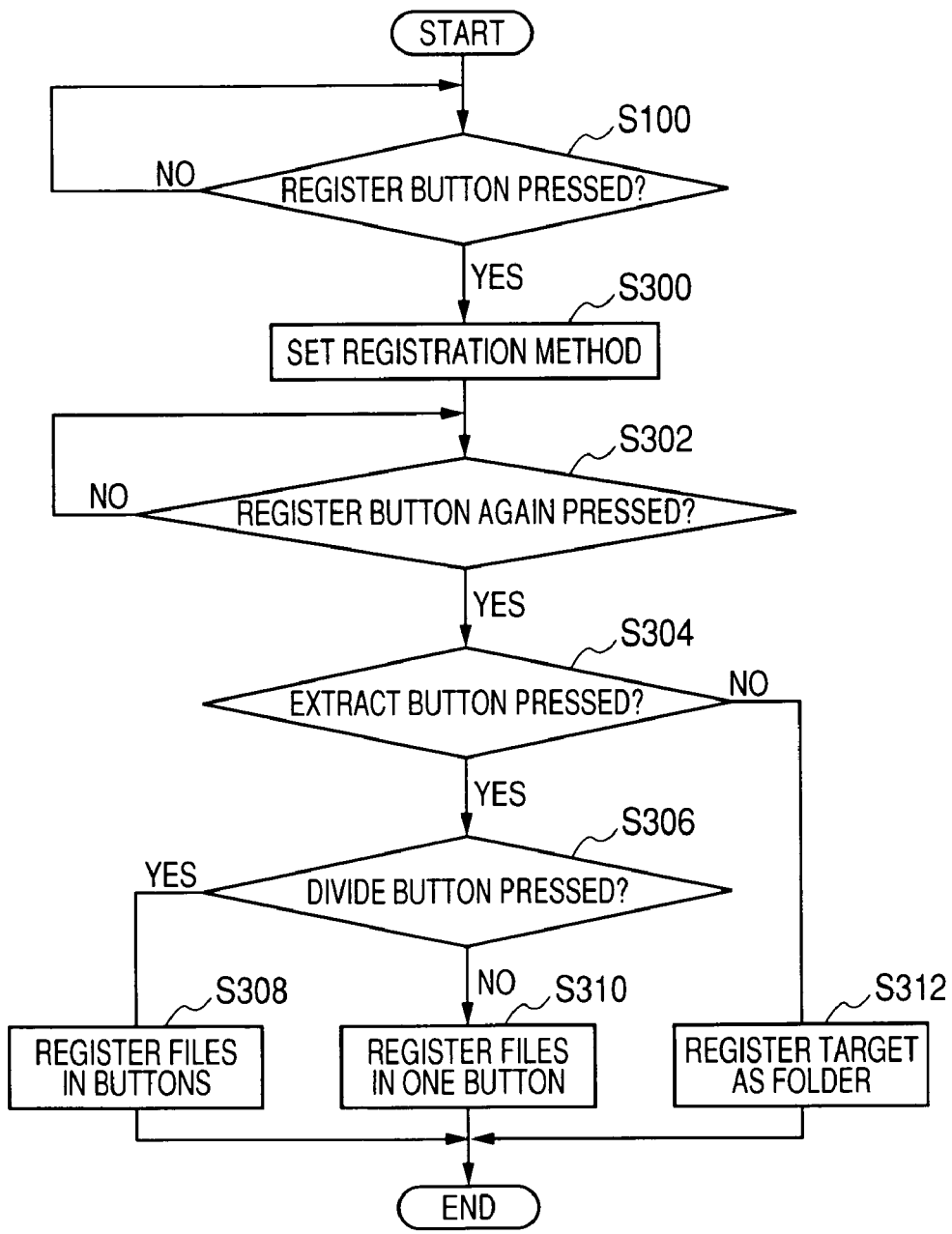
FIG. 20 is a flowchart to show extraction processing of extracting and registering a plurality of targets contained in one work set in the information processing apparatus.

FIG. 20 is a flowchart to show extraction processing of extracting and registering a plurality of targets contained in one work set (S30) in the information processing apparatus 10. Steps identical with those in the processing shown in FIG. 18 (S10) are denoted by the same step numbers in FIG. 20.

As shown in FIG. 20, at S100, the control section 206 determines whether or not the register button 44 is pressed.

At step 300 (S300), the control section 206 of the button management program 200 accepts setting of a target registration method by the user pressing the extract button 54 and the divide button 52. If the user presses at least either of the extract button 54 and the divide button 52, the control section 206 controls the display section 214 for changing the appearance of the pressed button for display.

At step 302 (S302), the control section 206 determines whether or not the user again presses the register button 44. If the user again presses the register button 44, the control section 206 proceeds the process to S304; otherwise, the control section 206 returns the process to S302.

At step 304 (S304), the control section 206 determines whether or not the extract button 54 is pressed. If the extract button 54 is pressed, the control section 206 proceeds the process to S306; otherwise, the control section 206 returns the process to S312.

At step 306 (S306), the control section 206 determines whether or not the divide button 52 is pressed. If the divide button 52 is pressed, the control section 206 proceeds the process to S308; otherwise, the control section 206 returns the process to S310.

At step 308 (S308), the control section 206 assigns a plurality of targets (files) contained in the active work set (folder) to different display buttons 42 and registers the data of the display buttons 42 in the button management table stored in the information storage section 218 through the registration section 208. The data of the display buttons 42 for specifying the files is newly registered in the button management table. The control section 206 controls the display section 214 for displaying the corresponding character strings on the display buttons 42.

At step 310 (S310), the control section 206 assigns the targets contained in the active work set to one display button 42 and registers the data in the button management table through the registration section 208. A plurality of electronic files are stored in the item "connection destination" in the button management table. The control section 206 controls the display section 214 for displaying the character string representing the plurality of targets on the display button 42.

At step 312 (S312), the control section 206 assigns the active work set (folder) to the display button 42 and registers the data in the button management table through the registration section 208. The path to the folder is stored in the item "connection destination" in the button management table. The control section 206 controls the display section 214 for displaying the character string representing the work set (for example, the folder name) on the display button 42.

Figure 21:
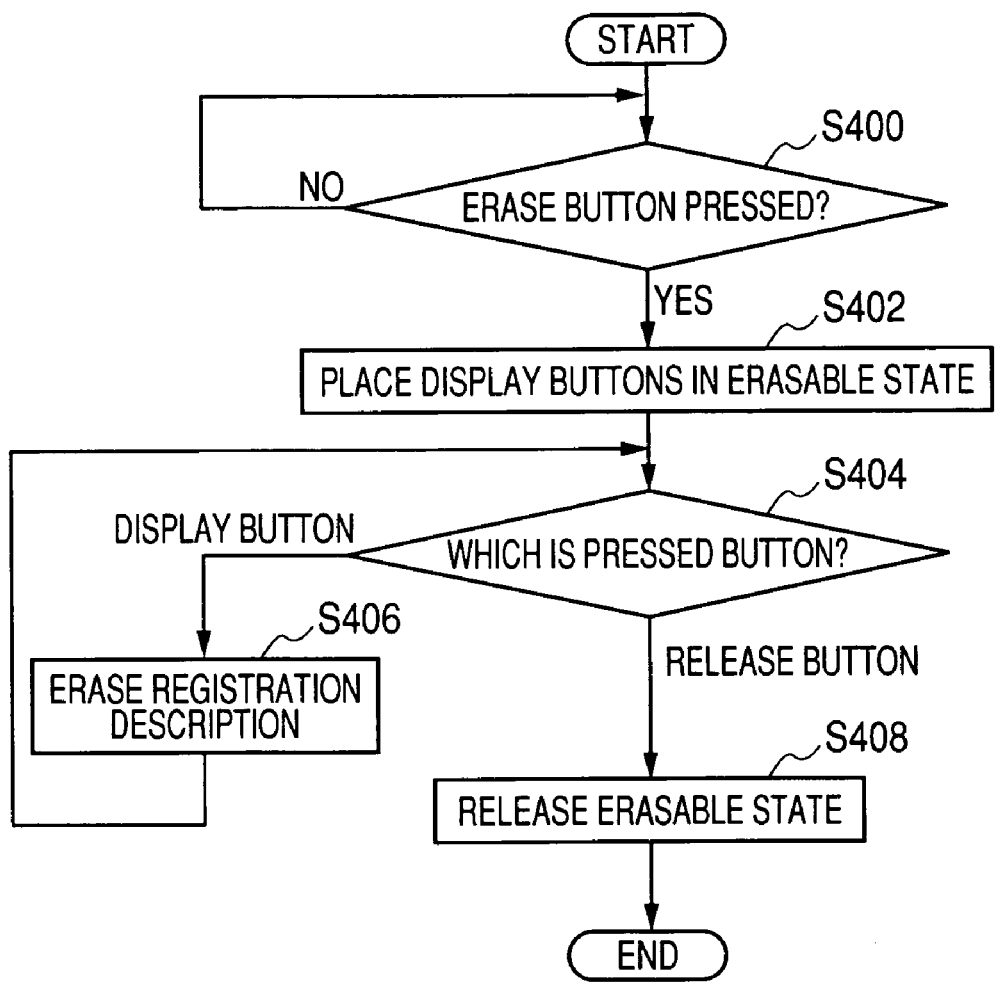
FIG. 21 is a flowchart to show erasion processing of the registration description of the display button in the information processing apparatus.

FIG. 21 is a flowchart to show erasion processing of the registration description of the display button 42 (S40) in the information processing apparatus 10.

As shown in FIG. 21, at step 400 (S400), the control section 206 of the button management program 200 determines whether or not the user presses the erase button 50 of the information access unit 16. If the user presses the erase button 50, the control section 206 proceeds the process to S402; otherwise, the control section 206 returns the process to S400.

At step 402 (S402), the control section 206 places the display buttons 42 in an erasable state in which the assignment description can be erased. The control section 206 controls the display section 214 for changing the appearance of the erase button 50 for display.

At step 404 (S404), the control section 206 determines whether the subsequently pressed button is the display button 42 or the release button 48. If the display button 42 is pressed, the control section 206 proceeds the process to S406; if the release button 48 is pressed, the control section 206 proceeds the process to S408. At this time, if the erase button 50 is again pressed, the control section 206 may proceed the process to S408.

At step 406 (S406), the control section 206 erases the description registered in the display button 42. More specifically, the control section 206 deletes the data corresponding to the display button 42 from in the button management table stored in the information storage section 218 through the deletion section 212. The control section 206 controls the display section 214 for erasing the character string displayed on the display button 42.

At step 408 (S408), the control section 206 releases the erasable state. The control section 206 controls the display section 214 for restoring the appearance of the erase button 50 to the usual appearance for display.

As described above, the information processing apparatus 10 according to the embodiment has the displays 14a to 14c, the display buttons 42, and the assignment unit for assigning a target selected on at least any of the displays 14a to 14c to any of the display buttons. Accordingly, the user can easily assign the target to be displayed to the display button 42 specifying the target to be displayed.

The information processing apparatus 10 assigns a plurality of targets selected on the displays 14a to 14c to one of the display buttons 42 or assigns a plurality of selected targets to the different display buttons 42. Accordingly, the user can assign a plurality of targets to the display button or display buttons 42 efficiently by single operation.

Further, the information processing apparatus 10 assigns a plurality of targets contained in a selected work set to the display button 42. Accordingly, burden on the user in the button assignment operation can be lightened.

The information processing apparatus 10 according to the embodiment further has the user information storage unit for storing user information, and assigns a target retrieved based on the user information stored in the user information storage unit to the display button 42. Particularly, if the information processing apparatus 10 assigns the target retrieved based on the user information to the display button 42, it changes the appearance of the display button 42. Accordingly, the information processing apparatus 10 can automatically assign a plurality of targets required by the user to the display button 42. Thus, the user can effectively recognize assignment of the interesting target and can easily display and view the target.

Further, the information processing apparatus 10 according to the embodiment has the displays 14a to 14c, the display buttons 42, and the display control unit for displaying a target assigned to the display button 42 on at least any of the displays 14a to 14c. Accordingly, the user can efficiently and easily display a plurality of targets on the displays 14a to 14c. Particularly, the information processing apparatus 10 displays a plurality of targets specified by operating the display button 42 on the different displays 14a to 14c. The information processing apparatus 10 according to the embodiment has the displays 14a to 14c, the display buttons 42, the assignment unit for assigning a target selected on at least any of the displays 14a to 14c to any of the display buttons 42, and the display control unit for displaying the target assigned by the assignment unit on at least any of the displays 14a to 14c based on operation of the display button 42. Accordingly, the user can view a plurality of targets at a time as viewability is enhanced.

As described above, the information processing apparatus efficiently and easily performs display control of a plurality of content display screens required by the user. Accordingly the information processing apparatus according to the embodiment can support smooth job execution of the user.

What is claimed is:

1. An information processing apparatus comprising:
a plurality of display devices;
a plurality of display instruction units;
an assignment unit including a collector that assigns a plurality of targets that are selected on at least any one of the display devices to one of the display instruction units in response to activation of a button so as to configure the assigned one of display instruction units that the plurality of targets are to be displayed on at least one of the display devices in accordance with a command input by the assigned one of the display instruction units and the collector of the assignment unit assigning subsequent targets to another of the display instruction units in response to subsequent activation of the button, wherein the assignment unit is a processor that is configured to access a computer readable medium encoded with a computer program;
a display control unit that displays the plurality of targets, which are assigned by the collector of the assignment unit, on at least one of the plurality of display devices based on operation of the assigned one of the display instruction units; and
a user information storage unit for storing user information entered by a user into the user information storage unit, wherein the assignment unit further includes a separator that searches for and automatically assigns targets to the display instruction units which are retrieved based on the user information stored in the user information storage unit, and the user information includes a keyword selected by extracting a word based on a plurality of entered words in a past given time period counting from an automatic search execution date.

2. The information processing apparatus according to claim 1, wherein the assignment unit further includes a separator that assigns the plurality of selected targets to the display instruction units different from one another.

3. The information processing apparatus according to claim 1, wherein the assignment unit further includes a separator that assigns a plurality of targets contained in a selected work set to the display instruction units.

4. The information processing apparatus according to claim claim 1, wherein when the separator of the assignment unit assigns the targets, which are retrieved based on the user information, to the display instruction units, appearance of the display instruction units is changed.

5. An assignment method for an information processing apparatus including a plurality of display devices and a plurality of display instruction units, the assignment method comprising:
accepting a plurality of targets that are selected on at least one of the display devices;
assigning the accepted targets to one of the display instruction units in response to activation of a button so as to configure the assigned one of display instruction units that the plurality of targets are to be displayed on at least one of the display devices in accordance with a command input by the assigned one of the display instruction units and assigning subsequent targets to another of the display instruction units in response to subsequent activation of the button;
displaying the plurality of targets on at least one of the plurality of the display devices based on operation of the assigned one of the display instruction units; and
searching for and automatically assigning found targets to the display instruction units which are retrieved based on user information stored in a user information storage unit, the user information being entered by a user into the user information storage unit, wherein the user information includes a keyword selected by extracting a word based on a plurality of entered words in a past given time period counting from an automatic search execution date.

6. A display method of an information processing apparatus including a plurality of display devices and a plurality of display instruction units, the display method comprising:
accepting a plurality of targets that are selected on at least one of the display devices;
assigning the accepted targets to one of the display instruction units in response to activation of a button so as to configure the assigned one of display instruction units that the plurality of targets are to be displayed on at least one of the display devices in accordance with a command input by the assigned one of the display instruction units and assigning subsequent targets to another of the display instruction units in response to subsequent activation of the button;
displaying the assigned targets on at least one of the plurality of display devices based on operation of the assigned one of the display instruction units; and
searching for and automatically assigning found targets to the display instruction units which are retrieved based on user information stored in a user information storage unit, the user information being entered by a user into the user information storage unit, wherein the user information includes a keyword selected by extracting a word based on a plurality of entered words in a past given time period counting from an automatic search execution date.

7. A non-transitory computer-readable storage medium storing a program for causing a computer of an information processing apparatus including the computer, a plurality of display devices, and a plurality of display instruction units to perform a process comprising:
accepting a plurality of targets that are selected on at least one of the display devices;
assigning the accepted targets to one of the display instruction units in response to activation of a button so as to configure the assigned one of display instruction units that the plurality of targets are to be displayed on at least one of the display devices in accordance with a command input by the assigned one of the display instruction units and assigning subsequent targets to another of the display instruction units in response to subsequent activation of the button;
displaying the plurality of targets on at least one of the plurality of the display devices based on operation of the assigned one of the display instruction units; and
searching for and automatically assigning found targets to the display instruction units which are retrieved based on user information stored in a user information storage unit, the user information being entered by a user into the user information storage unit, wherein the user information includes a keyword selected by extracting a word based on a plurality of entered words in a past given time period counting from an automatic search execution date.

8. A non-transitory computer-readable storage medium storing a program for causing a computer of an information processing apparatus including the computer, a plurality of display devices, and a plurality of display instruction units to perform a process comprising:
accepting a plurality of targets that are selected on at least one of the display devices;
assigning the accepted targets to one of the display instruction units in response to activation of a button so as to configure the assigned one of display instruction units that the plurality of targets are to be displayed on at least one of the display devices in accordance with a command input by the assigned one of the display instruction units and assigning subsequent targets to another of the display instruction units in response to subsequent activation of the button;
controlling the display devices to display the assigned targets on at least one of the plurality of display devices based on a command input through the assigned one of the display instruction units;
searching for and automatically assigning found targets to the display instruction units which are retrieved based on user information stored in a user information storage unit, the user information being entered by a user into the user information storage unit, wherein the user information includes a keyword selected by extracting a word based on a plurality of entered words in a past given time period counting from an automatic search execution date.

9. The information processing apparatus according to claim 1, wherein the assignment unit assigns a target so as to configure the display instruction units so as to configure the display instruction unit such that the target is to be displayed on a predetermined display device in accordance with a command input.

10. The display method of an information processing apparatus according to claim 5, wherein the assigning the accepted target to the display instruction unit further includes: assigning the accepted target to the display instruction units such that the target is to be is to be displayed on a predetermined display device in accordance with a command input by an assigned one of the display instruction units.

11. The display method of an information processing apparatus according to claim 6, wherein: the assigning the accepted target to the display instruction units, further includes:
assigning the accepted target to the display instruction units such that the target is to be is to be displayed on a predetermined display device in accordance with a command input by an assigned one of the display instruction units.

12. The computer-readable storage medium storing a program for causing a computer of an information processing apparatus including the computer, a plurality of display devices, and a plurality of display instruction units to perform a process, according to claim 7, wherein:
the assigning the accepted target to the display units, further includes:
assigning the accepted target to the display instruction units such that the target is to be is to be displayed on a predetermined display device in accordance with a command
input by an assigned one of the display instruction units.

13. The computer-readable storage medium storing a program for causing a computer of an information processing apparatus including the computer, a plurality of display devices, and a plurality of display instruction units to perform a process, according to claim 8, wherein:
the assigning the accepted target to the display units, further includes:
assigning the accepted target to the display instruction units such that the target is to be is to be displayed on a predetermined display device in accordance with a command input by an assigned one of the display instruction units.

14. The information processing apparatus according to claim 1, wherein the targets are automatically assigned to the display instruction units, and when the user selects the one of the display instruction unit to which a target is automatically assigned, the display instruction unit changes from an unassignable state to an assignable state.

15. The display method of an information processing apparatus according to claim 5, wherein the targets are automatically assigned to the display instruction units, and when the user selects the one of the display instruction unit to which a target is automatically assigned, the display instruction unit changes from an unassignable state to an assignable state.

16. The display method of an information processing apparatus according to claim 6, wherein the targets are automatically assigned to the display instruction units, and when the user selects the one of the display instruction unit to which a target is automatically assigned, the display instruction unit changes from an unassignable state to an assignable state.

17. The computer-readable storage medium storing a program for causing a computer of an information processing apparatus including the computer, a plurality of display devices, and a plurality of display instruction units to perform a process, according to claim 7, wherein:

the targets are automatically assigned to the display instruction units, and when the user selects the one of the display instruction unit to which a target is automatically assigned, the display instruction unit changes from an unassignable state to an assignable state.

18. The computer-readable storage medium storing a program for causing a computer of an information processing apparatus including the computer, a plurality of display devices, and a plurality of display instruction units to perform a process, according to claim 8, wherein:

the targets are automatically assigned to the display instruction units, and when the user selects the one of the display instruction unit to which a target is automatically assigned, the display instruction unit changes from an unassignable state to an assignable state.

* * * * *